US008880095B2

(12) United States Patent
Kobayashi et al.

(10) Patent No.: US 8,880,095 B2
(45) Date of Patent: Nov. 4, 2014

(54) POSITION INFORMATION AGGREGATION DEVICE AND POSITION INFORMATION AGGREGATION METHOD

(75) Inventors: Motonari Kobayashi, Chiyoda-ku (JP); Masayuki Terada, Chiyoda-ku (JP); Ichiro Okajima, Chiyoda-ku (JP)

(73) Assignee: NTT DoCoMo, Inc., Tokyo (JP)

( * ) Notice: Subject to any disclaimer, the term of this patent is extended or adjusted under 35 U.S.C. 154(b) by 109 days.

(21) Appl. No.: 13/814,128

(22) PCT Filed: Oct. 13, 2011

(86) PCT No.: PCT/JP2011/073590
§ 371 (c)(1),
(2), (4) Date: Feb. 4, 2013

(87) PCT Pub. No.: WO2012/050176
PCT Pub. Date: Apr. 19, 2012

(65) Prior Publication Data
US 2013/0137459 A1    May 30, 2013

(30) Foreign Application Priority Data

Oct. 13, 2010 (JP) ................................. 2010-230690
Feb. 4, 2011 (JP) ................................. 2011-022950

(51) Int. Cl.
*H04W 24/00* (2009.01)
*G06Q 30/02* (2012.01)

(52) U.S. Cl.
CPC ........... *H04W 24/00* (2013.01); *G06Q 30/0201* (2013.01)
USPC ....................................... 455/456.1; 455/457

(58) Field of Classification Search
CPC ..... H04W 4/021; H04W 4/025; H04W 4/028; H04W 4/20; H04M 1/72572; H04M 2250/10

USPC .............................................. 455/456.1–457
See application file for complete search history.

(56) References Cited

U.S. PATENT DOCUMENTS

| 2008/0208444 A1* | 8/2008 | Ruckart ........................ 701/200 |
| 2008/0268870 A1* | 10/2008 | Houri ......................... 455/456.1 |
| 2009/0325603 A1* | 12/2009 | Van Os et al. .............. 455/456.2 |

FOREIGN PATENT DOCUMENTS

| JP | 2002-342557 A | 11/2002 |
| JP | 2003-30373 A | 1/2003 |
| JP | 2003 122877 | 4/2003 |
| JP | 2005 286657 | 10/2005 |

OTHER PUBLICATIONS

International Preliminary Report and Written Opinion issued May 16, 2013, in International application No. PCT/JP2011/073590.

(Continued)

*Primary Examiner* — Chuong A Ngo
(74) *Attorney, Agent, or Firm* — Oblon, Spivak, McClelland, Maier & Neustadt, L.L.P.

(57) ABSTRACT

A position information aggregation device includes a position information receiving unit receives position information related to the positions of a plurality of mobile communication terminals together with a user ID specifying a user of the terminal corresponding to each position information and an address code of the user, an acquisition rate calculating unit that calculates a position information acquisition rate of each address code of the plurality of terminals using population statistics data and position information of each narrow area in a predetermined broad area, and an aggregating unit that aggregates a population distribution in a certain area by extracting the position information corresponding to the certain area based on the position information received by the position information receiving unit and aggregating the position information in which the position information acquisition rate corresponding to the address code included in the position information is reflected.

12 Claims, 34 Drawing Sheets

(56) References Cited

OTHER PUBLICATIONS

Office Action issued May 1, 2014 in Korean Patent Application No. 10-2013-7002583 with English language translation.

International Search Report Issued Jan. 17, 2012 in PCT/JP11/073590 Filed Oct. 13, 2011.

Office Action issued Jan. 7, 2014 in Japanese Patent Application No. 2012-538717 with English language translation.

* cited by examiner

Fig.2

| USER ID | TIME INFORMATION | POSITION INFORMATION | ATTRIBUTE INFORMATION 1 GENDER | ATTRIBUTE INFORMATION 2 AGE | ATTRIBUTE INFORMATION 3 OCCUPATION | ATTRIBUTE INFORMATION 4 ADDRESS CODE | ... |
|---|---|---|---|---|---|---|---|
| ... | ... | ... | ... | ... | ... | ... | ... |
| A | 3/1 1:03 | X1, Y1 | MALE | 0 | OCCUPATION 1 | 10101010 | ... |
| B | 3/1 1:53 | X2, Y2 | FEMALE | 1 | OCCUPATION 2 | 10101011 | ... |
| C | 3/1 2:03 | X3, Y3 | MALE | 2 | OCCUPATION 3 | 10101013 | ... |
| D | 3/1 2:05 | X4, Y4 | MALE | 2 | OCCUPATION 4 | 10101015 | ... |
| ... | ... | ... | ... | ... | ... | ... | ... |

| AGE | MALE POPULATION | FEMALE POPULATION | ·· |
|---|---|---|---|
| 0 | 1,000 | 1,102 | ·· |
| 1 | 4,000 | 1,904 | ·· |
| 2 | 1,300 | 1,210 | ·· |
| ⋮ | ⋮ | ⋮ | ⋮ |

(b)

| ADDRESS CODE | POPULATION | ·· |
|---|---|---|
| 10101010 | 1,200 | ·· |
| 10101011 | 1,500 | ·· |
| 10101013 | 1,700 | ·· |
| 10101015 | 2,000 | ·· |
| ⋮ | ⋮ | ⋮ |

| AGE | NUMBER OF MALE USERS | NUMBER OF FEMALE USERS | .. |
|---|---|---|---|
| 0 | 100 | 110 | .. |
| 1 | 200 | 190 | .. |
| 2 | 300 | 210 | .. |
| ⋮ | ⋮ | ⋮ | ⋮ |

(b)

| AGE | MALE ACQUISITION RATE MASK | FEMALE ACQUISITION RATE MASK |
|---|---|---|
| 0 | 10 | 10.02 |
| 1 | 20 | 10.02 |
| 2 | 4.33 | 5.76 |
| ⋮ | ⋮ | ⋮ |

(c)

| ADDRESS CODE | NUMBER OF USERS | .. |
|---|---|---|
| 10101010 | 120 | .. |
| 10101011 | 100 | .. |
| 10101013 | 140 | .. |
| 10101015 | 220 | .. |
| ⋮ | ⋮ | ⋮ |

(d)

| ADDRESS CODE | ACQUISITION RATE MASK |
|---|---|
| 10101010 | 10 |
| 10101011 | 15 |
| 10101013 | 12.1 |
| 10101015 | 9.09 |
| ⋮ | ⋮ |

*Fig.5*

| ADDRESS CODE | ACQUISITION RATE MASK |
|---|---|
| 10101010 | 1 |
| 10101011 | 1.5 |
| 10101013 | 1.21 |
| 10101015 | 0.909 |
| : | : |

Fig.6

| USER ID | TIME INFORMATION | POSITION INFORMATION | ATTRIBUTE INFORMATION 1 GENDER | ATTRIBUTE INFORMATION 2 AGE | ADDRESS CODE | CORRECTION VALUE | ... |
|---|---|---|---|---|---|---|---|
| ... | ... | ... | ... | ... | ... | ... | ... |
| A | 3/1 1:03 | X1, Y1 | MALE | 0 | 10101010 | 10 | ... |
| B | 3/1 1:53 | X2, Y2 | FEMALE | 1 | 10101011 | 10.02 | ... |
| C | 3/1 2:03 | X3, Y3 | MALE | 2 | 10101013 | 4.33 | ... |
| D | 3/1 2:05 | X4, Y4 | MALE | 2 | 10101015 | 4.33 | ... |
| ... | ... | ... | ... | ... | ... | ... | ... |

Fig.7

| AGGREGATION TARGET TIME ZONE | AGGREGATION AREA | POPULATION |
|---|---|---|
| ⋮ | ⋮ | ⋮ |
| 1:00 to 3:00 | AREA 1 | 1399.3 |
| 1:00 to 3:00 | AREA 2 | 278.3367 |
| 1:00 to 3:00 | AREA 3 | 723.1135 |
| 1:00 to 3:00 | AREA 4 | 98.765 |
| ⋮ | ⋮ | ⋮ |

Fig.16

| USER | | CONTRACTOR | | | |
|---|---|---|---|---|---|
| AGE OF 0 | MALE | AGE OF 0 | (MALE) | a000011 | 0 |
| | | | (FEMALE) | a000012 | |
| | | AGE OF 1 | (MALE) | a000013 | 0 |
| | | | (FEMALE) | | |
| | | ... | | | |
| | | AGE OF 20 | (MALE) | a000051 | 0 |
| | | | (FEMALE) | a000052 | 0 |
| | | ... | | | |
| | | AGE OF 30 | (MALE) | a000071 | 0.1 |
| | | | (FEMALE) | a000072 | 0.2 |
| | | ... | ... | ... | |
| | | AGE OF 60 | (MALE) | a000131 | 0.1 |
| | | ... | | | |
| | | AGE OF 70 | (MALE) | a000151 | 0 |
| | | | (FEMALE) | a000152 | |
| AGE OF 0 | FEMALE | AGE OF 0 | (MALE) | a001011 | 0 |
| | | | (FEMALE) | a001012 | |
| | | AGE OF 1 | (MALE) | a001013 | 0 |
| | | | (FEMALE) | | |
| | | ... | | | |
| | | AGE OF 20 | (MALE) | a001051 | 0 |
| | | | (FEMALE) | a001052 | 0 |
| | | ... | | | |
| | | AGE OF 30 | (MALE) | a001071 | 0.1 |
| | | | (FEMALE) | a001072 | 0.2 |
| | | ... | ... | ... | |
| | | AGE OF 60 | (MALE) | a001131 | 0.1 |
| | | ... | | | |
| | | AGE OF 70 | (MALE) | a001151 | 0 |
| | | | (FEMALE) | a001152 | |
| ... | | | | | |
| AGE OF 18 | MALE | AGE OF 0 | (MALE) | a037011 | 0 |
| | | | (FEMALE) | a037012 | |
| | | AGE OF 1 | (MALE) | a037013 | 0 |
| | | ... | | | |
| | | AGE OF 70 | (MALE) | a037151 | 0.1 |
| | | | (FEMALE) | a037152 | |
| | | ... | | | |
| ... | | | | | |
| AGE OF 70 | FEMALE | AGE OF 0 | (MALE) | a141011 | 0 |
| | | | (FEMALE) | a141012 | |
| | | AGE OF 1 | (MALE) | a141013 | 0 |
| | | ... | | | |
| | | AGE OF 70 | (MALE) | a141151 | 0.1 |
| | | | (FEMALE) | a141152 | 0 |

(a)

$$A = \begin{pmatrix} a000011 & a001011 & a002011 & a003011 & \cdots & a141011 \\ a000012 & a001012 & & & & \\ a000013 & a001013 & & & & \\ a000014 & a001014 & & & & \\ a000015 & & & & & \\ a000016 & & & & & \cdots \\ a000017 & & & & & \\ a000018 & & & & & \\ a000019 & & & & & \\ \cdots & & & & & \cdots \\ a000152 & & & & & a141152 \end{pmatrix}$$

(b)

$$A^{-1} = \begin{pmatrix} b000011 & b001011 & b002011 & b003011 & \cdots & b141011 \\ b000012 & b001012 & & & & \\ b000013 & b001013 & & & & \\ b00014 & b001014 & & & & \\ b00015 & & & & & \\ b00016 & & & & & \cdots \\ b00017 & & & & & \\ b00018 & & & & & \\ b00019 & & & & & \\ \cdots & & & & & \cdots \\ b000152 & & & & & b141152 \end{pmatrix}$$

*Fig.18*
(a)
| AGE | NUMBER OF MALE CONTRACTORS | NUMBER OF FEMALE CONTRACTORS | .. |
|---|---|---|---|
| 0 | 100 | 110 | .. |
| 1 | 200 | 190 | .. |
| 2 | 300 | 210 | .. |
| ⋮ | ⋮ | ⋮ | ⋮ |
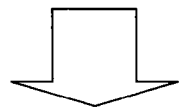
APPLY INVERSE MATRIX
(b)
| AGE | NUMBER OF MALE USERS | NUMBER OF FEMALE USER |
|---|---|---|
| 0 | ××× | ××× |
| 1 | ××× | ××× |
| 2 | ××× | ××× |
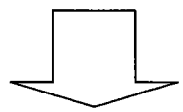
(c)
| AGE | MALE ACQUISITION RATE MASK | FEMALE ACQUISITION RATE MASK |
|---|---|---|
| 0 | ××× | ××× |
| 1 | ××× | ××× |
| 2 | ××× | ××× |
| ⋮ | ⋮ | ⋮ |

Fig.19
(a)
| ADDRESS CODE | NUMBER OF CONTRACTORS |
|---|---|
| 10101010 | 120 |
| 10101011 | 100 |
| 10101013 | 140 |
| 10101015 | 220 |
| : | : |
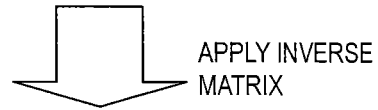
APPLY INVERSE MATRIX
(b)
| ADDRESS CODE | NUMBER OF USERS |
|---|---|
| 10101010 | ×××  |
| 10101011 | ×××  |
| 10101015 | ×××  |
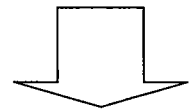
(c)
| ADDRESS CODE | ACQUISITION RATE MASK |
|---|---|
| 10101010 | ×××  |
| 10101011 | ×××  |
| 10101013 | ×××  |
| 10101015 | ×××  |
| : | : |

Fig.20

| ATTRIBUTE INFORMATION 1 GENDER | ATTRIBUTE INFORMATION 2 AGE | ADDRESS CODE | CORRECTION VALUE |
|---|---|---|---|
| MALE | 0 | 101010 | ××× |
| FEMALE | 0 | 101010 | ××× |
| MALE | 1 | 101010 | ××× |
| ⋮ | ⋮ | ⋮ | ⋮ |

| USER ID | TIME INFORMATION | POSITION INFORMATION | ATTRIBUTE INFORMATION 1 GENDER | ATTRIBUTE INFORMATION 2 AGE | ATTRIBUTE INFORMATION 3 OCCUPATION | ATTRIBUTE INFORMATION 4 ADDRESS CODE | ... |
|---|---|---|---|---|---|---|---|
| ... | ... | ... | ... | ... | ... | ... | ... |
| A | 3/1 1:03 | X1, Y1 | MALE | 0 | OCCUPATION 1 | 10101010 | ... |
| B | 3/1 1:53 | X2, Y2 | FEMALE | 1 | OCCUPATION 2 | 10101011 | ... |
| C | 3/1 2:03 | X3, Y3 | MALE | 2 | OCCUPATION 3 | 10101013 | ... |
| D | 3/1 2:05 | X4, Y4 | MALE | 2 | OCCUPATION 4 | 10101015 | ... |
| ... | ... | ... | ... | ... | ... | ... | ... |

⇒ AGGREGATION ACCORDING TO EACH ATTRIBUTE USED TO OBTAIN MASK (b)

| AGGREGATION TARGET TIME | AGGREGATION AREA | AGE | GENDER | ADDRESS | NUMBER OF CONTRACTORS |
|---|---|---|---|---|---|
| 3/1 1:00 to 2:00 | AREA 1 | 0 | MALE | 10101010 | ××× |
| 3/1 2:00 to 3:00 | AREA 1 | 0 | MALE | 10101010 | ××× |
| ... | ... | ... | ... | ... | ... |

⇒ APPLY ALL INVERSE MATRICES USED TO OBTAIN MASK (NUMBER OF USERS IS CORRECTED)

(c)

| AGGREGATION TARGET TIME | AGGREGATION AREA | AGE | GENDER | ADDRESS | NUMBER OF USERS |
|---|---|---|---|---|---|
| | | | | | |
| | | | | | |
| | | | | | |

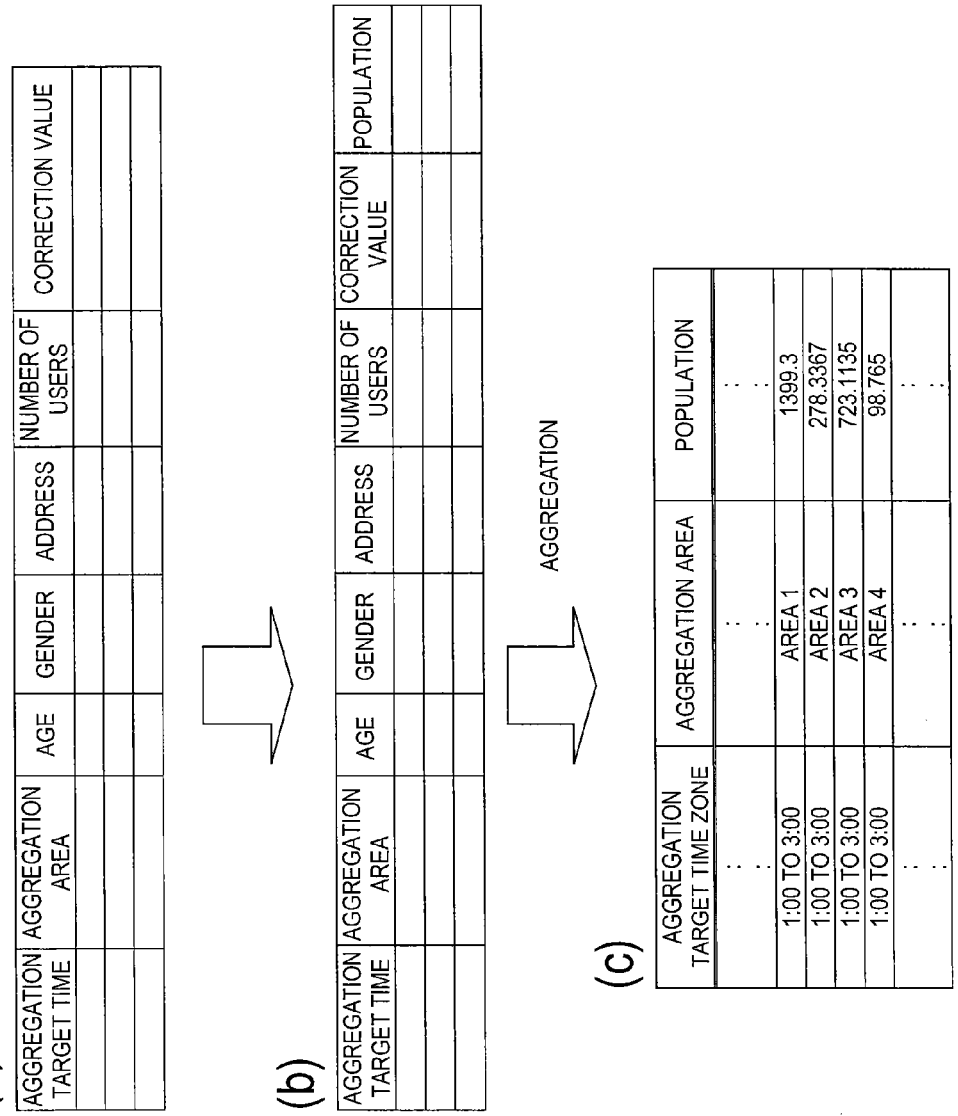

|  | A⁻¹ CORRECTION | B CORRECTION |
|---|---|---|
| 10'S | 30 | 30 |
| 30'S | 60 | 60 |
| 60'S | 30 | 30 |

(b)

|  | A⁻¹ CORRECTION | B CORRECTION |
|---|---|---|
| 10'S | 90 | 56.66 |
| 30'S | 20 | 46.66 |
| 60'S | 10 | 16.66 |

(c)

|  | A⁻¹ CORRECTION | B CORRECTION |
|---|---|---|
| 10'S | 10 | 18.333 |
| 30'S | 40 | 53.333 |
| 60'S | 70 | 48.333 |

Fig.27

|       | A⁻¹ CORRECTION | B CORRECTION |
|-------|----------------|--------------|
| 10'S  | 20             | 30           |
| 30'S  | 100            | 80           |
| 60'S  | 20             | 30           |

Fig.30

| USER ID | TIME INFORMATION | POSITION INFORMATION | ATTRIBUTE INFORMATION 1 GENDER | ATTRIBUTE INFORMATION 2 AGE | ATTRIBUTE INFORMATION 3 OCCUPATION | ATTRIBUTE INFORMATION 4 ADDRESS CODE | FEATURE QUANTITY | ... |
|---|---|---|---|---|---|---|---|---|
| ... | ... | ... | ... | ... | ... | ... | ... | ... |
| A | 3/1 1:03 | X1, Y1 | MALE | 0 | OCCUPATION 1 | 10101010 | wA | ... |
| B | 3/1 1:53 | X2, Y2 | FEMALE | 1 | OCCUPATION 2 | 10101011 | wB | ... |
| C | 3/1 2:03 | X3, Y3 | MALE | 2 | OCCUPATION 3 | 10101013 | wC | ... |
| D | 3/1 2:05 | X4, Y4 | MALE | 2 | OCCUPATION 4 | 10101015 | wD | ... |
| ... | ... | ... | ... | ... | ... | ... | ... | ... |

Fig.34

| USER ID | TIME INFORMATION | POSITION INFORMATION | ATTRIBUTE INFORMATION 1 GENDER | ATTRIBUTE INFORMATION 2 AGE | ATTRIBUTE INFORMATION 3 OCCUPATION | ATTRIBUTE INFORMATION 4 ADDRESS CODE | FEATURE QUANTITY | SIGNAL TYPE INFORMATION | ... |
|---|---|---|---|---|---|---|---|---|---|
| ... | ... | ... | ... | ... | ... | ... | ... | ... | ... |
| A | 3/1 1:03 | X1, Y1 | MALE | 0 | OCCUPATION 1 | 10101010 | wA | A | ... |
| B | 3/1 1:53 | X2, Y2 | FEMALE | 1 | OCCUPATION 2 | 10101011 | wB | A | ... |
| C | 3/1 2:03 | X3, Y3 | MALE | 2 | OCCUPATION 3 | 10101013 | wC | B | ... |
| D | 3/1 2:05 | X4, Y4 | MALE | 2 | OCCUPATION 4 | 10101015 | wD | B | ... |
| ... | ... | ... | ... | ... | ... | ... | ... | ... | ... |

POSITION INFORMATION AGGREGATION DEVICE AND POSITION INFORMATION AGGREGATION METHOD

TECHNICAL FIELD

The present invention relates to a position information aggregation device and a position information aggregation method.

BACKGROUND ART

In the past, devices that acquire position information of a portable terminal and analyze a population distribution of users of portable terminals based on the position information have been known (see Patent Literatures 1 and 2). By using position information of a portable terminal described above, it is possible to obtain a population distribution in which the user's migration tendency is also reflected compared to population statistics data obtained by a population census or the like.

For example, the device discussed in Patent Literature 1 aggregates the population distribution corresponding to a target area and target class using a database storing position information related to each portable terminal. Further, the device discussed in Patent Literature 2 generates a result of aggregating response signals of terminals that have received a terminal confirmation signal through each base station as population density information.

CITATION LIST

Patent Literature

Patent Literature 1: JP 2003-30373 A
Patent Literature 2: JP 2005-286657 A

SUMMARY OF INVENTION

Technical Problem

In recent years, various active position information acquisition methods such as acquisition of position information using a global positioning system (GPS) or acquisition of position information by specifying a serving base station have been implemented in a portable terminal. Here, when the population distribution is analyzed using position information, parameters of a statistics target increase, and thus the population distribution is efficiently analyzed. However, in this case, a timing or the frequency to acquire position information differs according to each user, and thus it is difficult to analyze the population distribution with a high degree of accuracy.

In this regard, the present invention is made in light of the foregoing, and provides a position information aggregation device and a position information aggregation method, which are capable of calculating a high-accuracy population distribution using position information in which the acquisition frequency differs according to each user.

Solution to Problem

In order to solve the above problems, a position information aggregation device according to the present invention includes a position information receiving section that receives position information related to a position of a plurality of mobile communication terminals, together with user specifying information specifying a user of the mobile communication terminal corresponding to each position information and attribute information representing an attribute including address information of the user, an acquisition rate calculating section that calculates a position information acquisition rate of each narrow area of the plurality of mobile communication terminals using population statistics data of each narrow area in a predetermined broad area and the position information, and an aggregating section that aggregates a population distribution in a certain area by extracting the position information corresponding to the certain area based on the position information received by the position information receiving section and aggregating the position information in which the position information acquisition rate of the narrow area corresponding to the address information included in the position information is reflected.

Alternatively, a position information aggregation method according to the present invention includes receiving, by a position information aggregation device, position information related to a position of a plurality of mobile communication terminals, together with user specifying information specifying a user of the mobile communication terminal corresponding to each position information and attribute information representing an attribute including an address information of the user, calculating, by the position information aggregation device, a position information acquisition rate of each narrow area of the plurality of mobile communication terminals using population statistics data of each narrow area in a predetermined broad area and the position information, and aggregating, by the position information aggregation device, a population distribution in a certain area by extracting the position information corresponding to the certain area based on the position information obtained in the receiving of position information and aggregating the position information in which the position information acquisition rate of the narrow area corresponding to the address information included in the position information is reflected.

According to the position information aggregation device and the position information aggregation method, the position information related to the mobile communication terminal is received together with the user specifying information and attribute information including address information related to the user, a position information acquisition rate of each address of the user is calculated based on population statistics data and received position information of each narrow area of a broad area, and position information belonging to a certain area is aggregated while reflecting a position information acquisition rate corresponding to an address of a user of a mobile communication terminal, and thus even based on position information in which a tendency of an acquisition frequency differs according to a user's address, when statistics data of each area in a broad area such as the whole of Japan is prepared in advance, it is possible to reflect the distribution of actual users in the population distribution of a certain area with a higher degree of accuracy.

Preferably, the acquisition rate calculating section obtains the position information acquisition rate by calculating a ratio between population statistics data of each attribute and the number of pieces of position information aggregated for each attribute information. In this case, it is possible to acquire a position information acquisition rate of each attribute using population statistics data of a broad area which is prepared in advance with a high degree of accuracy.

Further, preferably, the position information receiving section receives the position information including two or more types of attribute information, the acquisition rate calculating section repeatedly calculate position information acquisition rates of two or more types of attributes of the plurality of mobile communication terminals using the population statistics data and the position information, and the aggregating section aggregates the position information while repeatedly reflecting the position information acquisition rates of the two or more types of attributes corresponding to the attribute information of the position information in the position information. Here, in the case in which this configuration is employed, when an acquisition frequency of position information differs according to a plurality of attributes such as an age, a gender, and an address of a user of a mobile communication terminal, by reflecting acquisition rates of a plurality of attributes in position information to be aggregated using population statistics data of a plurality of attributes which are prepared in advance, it is possible to obtain population distribution of each area with a high degree of accuracy.

Furthermore, preferably, the aggregating section aggregates the population distribution by correcting the position information using a value obtained by dividing the total number of pieces of position information within the broad area by the total number of pieces of population statistics data in the broad area and performing aggregation. In this case, when position information is aggregated using position information acquisition rates of a plurality of attributes, it is possible to properly correct a population distribution of each area.

Preferably, the position information aggregation device according to the present invention further includes a generating section that generates a transition matrix representing a ratio of attributes of actual users of all mobile communication terminals to attributes of contractors of all mobile communication terminals represented by contractor information, and generates an inverse matrix based on the transition matrix, and the aggregating section corrects a population distribution of each attribute using the inverse matrix generated by the generating section when position information in the certain area is aggregated. As a result, it is possible to aggregate the population distribution based on an attribute of an actual user, and it is possible to obtain a more accurate population distribution.

Further, preferably, the position information receiving section receives the position information that further include time information related to reception of the position information, the position information aggregation device further includes a before-after position information acquiring section that acquires, with respect to first position information of the position information received by the position information receiving section, time information of second position information which is immediately previous position information of the first position information among pieces of position information including the same user specifying information as the first position information and time information of third position information which is immediately following position information of the first position information and a feature quantity calculating section that calculates a feature quantity on the first position information based on two or more of the time information of the first position information, the time information of the second position information, and the time information of the third position information, the acquisition rate calculating section calculates a position information acquisition rate of each narrow area of the plurality of mobile communication terminals using the population statistics data and the feature quantity, and the aggregating section reflects the position information acquisition rate of a narrow area corresponding to address information included in the position information in a feature quantity on the position information corresponding to the certain area, and aggregates a population distribution in the certain area. As described above, it is possible to calculate the population distribution using the feature quantity, and thus it is possible to calculate the population distribution with a higher degree of accuracy.

Advantageous Effects of Invention

According to the present invention, it is possible to calculate a high-accuracy population distribution using position information in which the acquisition frequency differs according to each user.

BRIEF DESCRIPTION OF DRAWINGS

FIG. 2 is a diagram illustrating a configuration of data stored in a position information accumulating unit of FIG. 1.

FIG. 3 is a diagram illustrating a configuration of data stored in a statistics data storage unit of FIG. 1.

FIG. 4 is a diagram illustrating configurations of user population pyramid data and acquisition rate mask data generated by an acquisition rate calculating unit of FIG. 1.

FIG. 5 is a diagram illustrating a configuration of acquisition rate mask data corrected by an acquisition rate calculating unit of FIG. 1.

FIG. 6 is a diagram illustrating a configuration of position information in which an acquisition rate is reflected by an aggregating unit of FIG. 1.

FIG. 7 is a diagram illustrating a configuration of aggregation result information generated by an aggregating unit of FIG. 1.

FIG. 16 is an explanatory diagram illustrating a transition state from actual user's attribute information to contractor's attribute information.

FIG. 18 is an explanatory diagram illustrating a process of generating an acquisition rate mask according to an attribute (an age or a gender) using an inverse matrix $A_1^{-1}$.

FIG. 19 is an explanatory diagram illustrating a process of generating an acquisition rate mask according to an attribute (an address code) using an inverse matrix $A_2^{-1}$.

FIG. 20 is an explanatory diagram illustrating a correction table.

FIG. 21 is an explanatory diagram illustrating a process of generating interim data used as a source of an aggregation process.

FIG. 22 is an explanatory diagram illustrating an aggregation table in which a correction value is further associated with the number of users corrected according to an age, a gender, and an address code.

FIG. 23 is a flowchart illustrating a process of a position information aggregation system 1a.

FIG. 26 is an explanatory diagram illustrating a comparison result when the number of users is calculated based on the number of contractors using an inverse matrix $A^{-1}$ and a matrix B.

FIG. 27 is an explanatory diagram illustrating a comparison result according to a collection rate of a questionnaire.

FIG. 30 is a diagram illustrating a configuration of data stored in a position information accumulating unit.

FIG. 34 is a diagram illustrating a configuration of data stored in a position information accumulating unit.

DESCRIPTION OF EMBODIMENTS

Figure 1:
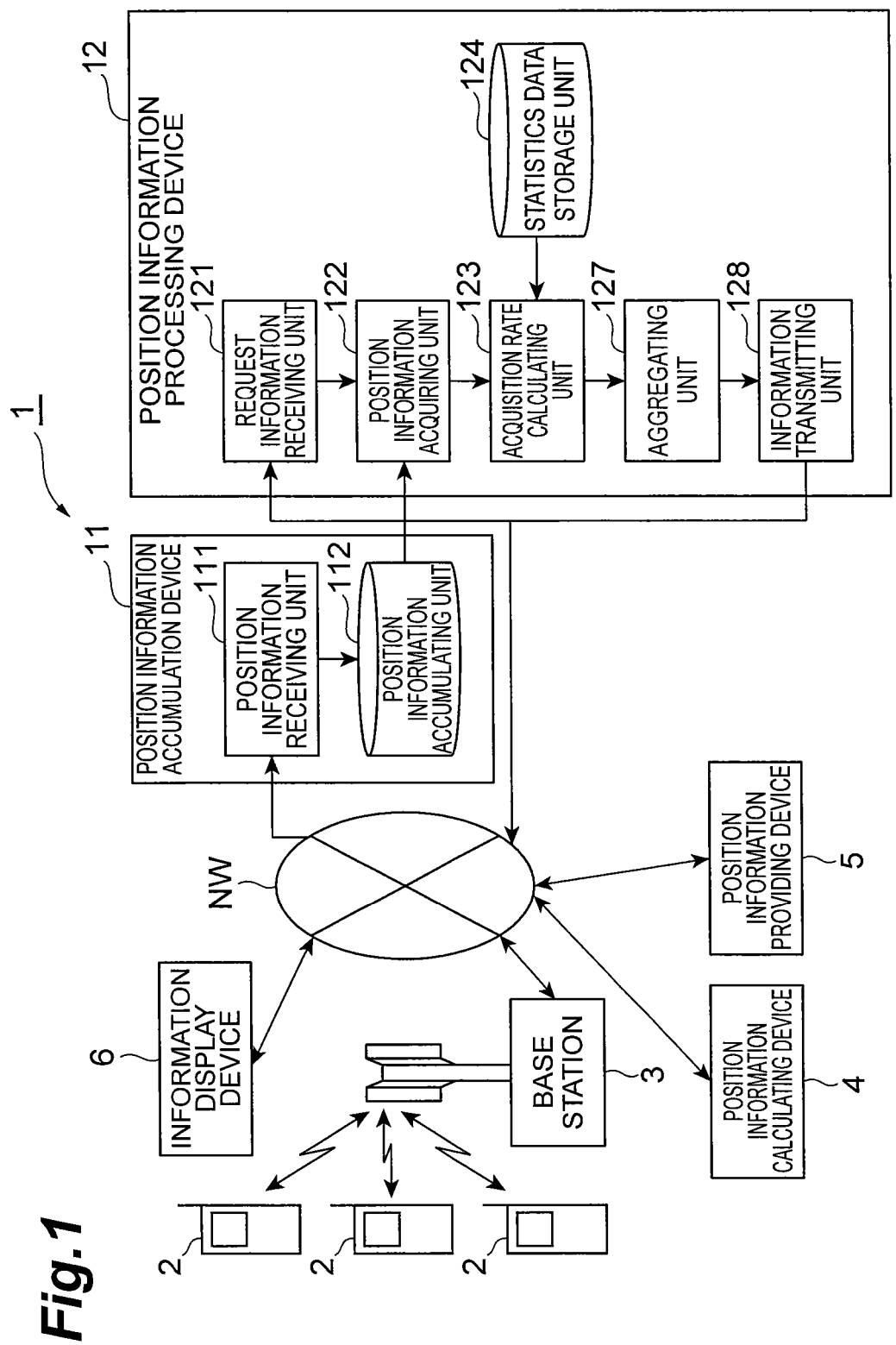
FIG. 1 is a schematic configuration diagram of a position information aggregation system according to an exemplary embodiment of the present invention.

Hereinafter, exemplary embodiments of a position information aggregation device and a position information aggregation method according to the present invention will be described in detail with reference to the accompanying drawings. In the description of the drawings, like reference numerals denote like parts, and thus repeated explanation is not made.

<First Embodiment>

FIG. 1 is a schematic configuration diagram of a position information aggregation system 1 according to an exemplary embodiment of the present invention. As illustrated in FIG. 1, the position information aggregation system 1 according to the present embodiment includes a plurality of mobile communication terminals 2, a base station 3, a position information calculating device 4, a position information providing device 5, an information display device 6, a position information accumulation device 11, and a position information processing device 12. The position information accumulation device 11 and the position information processing device 12 function as a position information aggregation device that aggregate position information related to the mobile communication terminal 2 and calculates a population distribution.

Each mobile communication terminal 2 is a portable terminal with a communication function such as a mobile telephone, a personal handyphone system (PHS), and a personal digital assistant (PDA). Each mobile communication terminal 2 is connected with the base station 3 by a mobile communication scheme, and can perform data communication and voice communication with another mobile communication terminal 2 via the base station 3 and the mobile communication network NW or a communication device connected to the mobile communication network NW. The position information calculating device 4, the position information providing device 5, the position information accumulation device 11, and the position information processing device 12 are server devices which are configured to perform data communication with one another via the mobile communication network NW. The information display device 6 is a terminal device, such as a portable terminal or a computer terminal, which is connected to the mobile communication network NW and configured to perform data communication with the position information processing device 12. Further, the position information providing device 5 is configured to perform data communication with the mobile communication terminal 2. In addition, each of the position information calculating device 4, the position information providing device 5, the position information accumulation device 11, and the position information processing device 12 is configured with a single server device but may be configured with a plurality of server devices which are dispersed, and on the contrary, functions of a plurality of server devices may be integrated into one server device.

The mobile communication terminal 2 has a function of executing a positioning process using GPS information or base station information. Upon receiving a positioning request from the user, the mobile communication terminal 2 acquires information necessary for the positioning process from GPS satellites or the like, and transmits the positioning request to the position information providing device 5 based on the acquired information. Upon receiving the positioning request, the position information providing device 5 extracts necessary information from the positioning request, and requests the position information calculating device 4 to perform a positioning calculation related to the mobile communication terminal 2. At this time, the position information calculating device 4 executes the positioning calculation related to the mobile communication terminal 2, and transmits position information related to the mobile communication terminal 2 to the position information providing device 5. The position information providing device 5 relays the position information to the mobile communication terminal 2. Then, the mobile communication terminal 2 converts the acquired position information into various output formats such as a position display on a map or letter information, and displays the position information on a display device. At this time, the position information providing device 5 transmits the position information related to the mobile communication terminal 2 to the position information accumulation device 11 simultaneously with relaying the position information to the mobile communication terminal 2. A transmission method of the positioning request is not limited to transmission caused when the positioning request is intentionally received from the user in order for the user to use the information provision service. For example, the positioning request may be automatically transmitted at regular intervals, or the positioning request may be transmitted by an event not intended by the user such as location registration occurring on the mobile communication network NW. Further, the mobile communication terminal 2 needs not necessarily have a positioning process function. For example, the positioning process may be executed by another device such as a base station control device in the mobile communication network NW. In this case, position information to be generated may be generated using a GPS or may be PRACH-PD positioning information generated using location registration information or center-of-gravity information of a serving area.

Next, the components of the position information accumulation device 11 and the position information processing device 12 will be described in detail.

The position information accumulation device 11 includes a position information receiving unit (a position information receiving section) 111 and a position information accumulating unit 112 as functional components. Each time the positioning request is made by the mobile communication terminal 2, the position information receiving unit 111 receives the position information related to the position of the mobile communication terminal 2 from the position information providing device 5, and stores the position information in the position information accumulating unit 112. Specifically, the position information receiving unit 111 receives a user ID (user specifying information) specifying the user of the mobile communication terminal 2 and time information representing a time at which the mobile communication terminal 2 acquires the position information, together with position information representing the latitude and the longitude at which the mobile communication terminal 2 is positioned. In addition, the position information receiving unit 111 receives an age and an occupation of the user of the mobile communication terminal 2 from a customer information database (not illustrated) connected to the mobile communication network NW and attribute information representing an address code (address information) or the like identifying the user's address according to the received user ID, and adds the received information to the position information.

FIG. 2 illustrates an example of a data configuration of the position information stored in the position information accumulating unit 112. As illustrated in FIG. 2, the position information accumulating unit 112 stores position information "X1,Y1" related to the mobile communication terminal 2, time information "3/1 1:03", attribute information 1—gender "male", attribute information 2—age "0", attribute information 3—occupation "occupation 1", attribute information 4—address code "10101010", and a user ID "A" in association with one another. The address code is numerical information specifying an address serving as an attribute of the user of the mobile communication terminal 2 hierarchically such that upper digits represent a province and lower digits represent a municipality, and set to a digit number according to a narrow area of a unit to calculate a position information acquisition rate which will be described later. The position information is accumulated and stored when a plurality of mobile communication terminals 2 makes the positioning request, but a storing timing is not limited to this timing. For example, a predetermined amount of information is buffered in the position information providing device 5 or another information storage device, and then transferred to the position information accumulation device 11 at regular intervals or as necessary.

The position information processing device 12 includes a request information receiving unit 121, position information acquiring unit (an aggregating section) 122, an acquisition rate calculating unit (an acquisition rate calculating section) 123, a statistics data storage unit 124, an aggregating unit (an aggregating section) 127, and an information transmitting unit 128 as functional components.

The request information receiving unit 121 receives request information requesting aggregation of information related to a population distribution estimated from the number of the mobile communication terminals 2 in a predetermined area in a predetermined time zone from the information display device 6, and activates a position information extracting process performed by the position information acquiring unit 122 in response to the request information. The request information includes time zone information to designate a time zone of an aggregation target and area information to designate a predetermined area of an aggregation target.

The position information acquiring unit 122 reads the position information from the position information accumulating unit 112 of the position information accumulation device 11 in response to an activation signal from the request information receiving unit 121. Then, the position information acquiring unit 122 extracts position information matching with the time zone information and the area information included in the request information from the information display device 6 from among all pieces of read position information, and outputs the extracted position information to the acquisition rate calculating unit 123. For example, when time zone information representing a condition of position information of a processing target is "3/1 1:00-3:00" and area information is "all over Japan," all pieces of position information representing that time information is included in a time zone represented by the time zone information, and position information corresponds to an area of the area information are extracted from the position information illustrated in FIG. 2.

Here, the position information acquiring unit 122 may operate to delete position information including an overlapping user ID from among position information matching with the request information. In this case, the position information acquiring unit 122 extracts position information on each user of the mobile communication terminal 2, and then outputs the extracted position information to the acquisition rate calculating unit 123. For example, the position information acquiring unit 122 extracts position information by selecting position information which is oldest in a time represented by time information or position information close to an average time or selecting position information in which the position represented thereby is close to the center of gravity or position information which is closest to a center position of a plurality of predetermined section areas which are set in advance from pieces of position information including the same user D.

The position information acquiring unit 122 may extract position information such that a time represented by time information included in position information having the same overlapping user ID has a predetermined time interval or more. For example, when a setting is made so that position information can be extracted such that an interval is "one day" or more, a plurality of pieces of position information having a time interval of "one day" or more specified by the time information are extracted from among pieces of position information having the same user ID. Further, a plurality of pieces of position information having the same user ID are extracted, the position information acquiring unit 122 may newly assign different user IDs to the pieces of position information. Specifically, user IDs "A1" and "A2" are assigned to two pieces of position information having a user ID "A."

The acquisition rate calculating unit 123 calculates a position information acquisition rate of each attribute of the user of the mobile communication terminal 2 using position information output from the position information acquiring unit 122 and population statistics data in a predetermined broad area (for example, all over Japan) stored in the statistics data storage unit 124. The statistics data storage unit 124 stores population pyramid data of the male population and the female population in an actual broad area according to an age, which is created based on population census data as illustrated in FIG. 3(a). Specifically, the male population "1,300" and the female population "1,210" of an age "2" are stored. The acquisition rate calculating unit 123 aggregates the number of male users and the number of female users (user population pyramid data) of mobile communication terminals 2 in the broad area according to an age based on the position information acquired from the position information acquiring unit 122. It is determined whether or not position information corresponds to the broad area based on position information. FIG. 4(a) illustrates user population pyramid data of the mobile communication terminals 2 aggregated in the above-described way. As illustrated in FIG. 4(a), the male user number "300" and the female user number "210" of an age "2" are aggregated. Then, the acquisition rate calculating unit 123 calculates a ratio of the population of population pyramid data and a user number of user population pyramid data according to an attribute of an age and a gender, and calculates a reciprocal number of a position information acquisition rate by the mobile communication terminal 2 on an actual population of each attribute. In other words, when a male population of an age "2" is "1,300" and the male user number of an age "2" is "300," the acquisition rate calculating unit 123 calculates a male acquisition rate mask "4.33," generates acquisition rate mask data according to an age and a gender as illustrated in FIG. 4(b), and outputs the acquisition rate mask data to the aggregating unit 127.

Here, the generation unit of the acquisition rate mask data is set to an interval of one in age and a classification according to a gender is made. However, the generation unit of the acquisition rate mask data may be set to an interval of five in age such as the ages of "0 to 4" or an interval of ten in age such as the ages of "0 to 9." Further, a classification may be made according to an age without distinction of gender, or a classification may be made according to a gender without distinction of age. In addition, acquisition rate mask data may be generated according to an age, a gender, and a narrow area using an address code included in position information and population pyramid data aggregated in advance according to an age, a gender, and a narrow area. Further, when position information does not include attribute information such as an age, all users may be assumed to have the same attribute, and the same acquisition rate mask value may be calculated. On the contrary, an attribute representing the user's character other than an age or a gender such as an occupation or a marital history "single/married" may be further used.

Further, the acquisition rate calculating unit 123 may repeatedly calculate a position information acquisition rate of every two or more types of attributes of the user of the mobile communication terminal 2 using the position information output from the position information acquiring unit 122 and the population statistics data stored in the statistics data storage unit 124. For example, in addition to the above-described process, the acquisition rate calculating unit 123 calculates a position information acquisition rate of each narrow area represented by an address code of the user of the mobile communication terminal. The statistics data storage unit 124 stores population pyramid data representing the actual population of each narrow area (address code) created based on population census data as illustrated in FIG. 3(b). Specifically, "1,200" is stored as the population of a narrow area represented by an address code "10101010." With respect to the position information acquired from the position information acquiring unit 122, the acquisition rate calculating unit 123 aggregates the user number (user population pyramid data) of the mobile communication terminal 2 of each narrow area (address code) in a broad area in which the position information corresponds to the broad area. The aggregation of position information performed on each narrow area may be performed by determining whether or not an address code corresponds to a narrow area based on an address code of attribute information 4 included in position information. FIG. 4(c) illustrates the user population pyramid data of the mobile communication terminal 2 aggregated in the above-described way. As illustrated in FIG. 4(c), "120" is aggregated as a user number of an address code "10101010." Further, the acquisition rate calculating unit 123 calculates a ratio of the population of the population pyramid data and the user number of the user population pyramid data for each narrow area, and calculates a reciprocal number of a position information acquisition rate by the mobile communication terminal 2 on the actual population of each address. In other words, when the population of the address code "10101010" is "1,200" and the user number is "120," the acquisition rate calculating unit 123 calculates an acquisition rate mask "10," generates acquisition rate mask data of each address code as illustrated in FIG. 4(b), and then outputs the acquisition rate mask data to the aggregating unit 127.

In addition, when position information acquisition rates of two or more types of attributes of the user are repeatedly generated, the acquisition rate calculating unit 123 corrects position information acquisition rates of second and subsequent types as follows. In detail, the acquisition rate calculating unit 123 calculates a correction value of an acquisition rate mask data by multiplying a value of an acquisition rate mask data by a value (for example, "0.1") obtained by dividing the total number of pieces of position information in a broad area by the total number of pieces of population statistics data in a broad area, and outputs the correction value to the aggregating unit 127 (FIG. 5).

Here, the aggregation unit is classified according to an address code. However, a classification may be made using an attribute representing the user's character such as an occupation or a marital history "single/married," other than address code or a classification may be made according to a combination of two or more attributes such as occupation in addition to an address code. Further, when the position information acquisition rate is repeatedly generated, for example, the acquisition rate calculating unit 123 may make a classification according to an address code in a first aggregation process and may make a classification according to an occupation different from the first aggregation unit in a second aggregation process. However, when position information acquisition rates of two or more classifications are generated, it is preferable that attributes included in the classifications do not overlap each other. For example, when a classification is made according to an age and a gender in the first aggregation process, a classification is made using an attribute other than an age and a gender in the second aggregation process. Further, the acquisition rate calculating unit 123 which is a single component may calculate a plurality of types of position information acquisition rates, or a plurality of types of position information acquisition rates may be calculated on two or more components.

The aggregating unit 127 repeatedly reflects acquisition rate masks corresponding to a plurality of types of attribute information included in position information on all pieces of position information extracted by the position information acquiring unit 122. In detail, when the position information including the attribute information 1—gender "male," the attribute information 2—age "0," and the attribute information 4—address code "10101010" as illustrated in FIG. 2 is extracted, the aggregating unit 127 extracts a male acquisition rate mask "10" and a contract rate mask "1" from data illustrated in FIGS. 4(b) and 5 as the acquisition rate mask corresponding to the position information. Then, the aggregating unit 127 calculates a value "10" obtained by multiplying data of the position information by the acquisition rate masks "10" and "1" as a correction value, and adds the correction value to the position information (FIG. 6). The correction value obtained in the above-described way is corrected to a value representing the specific gravity of each position information on the actual population when the acquisition rate masks corresponding to a plurality of types of attributes are reflected on the position information.

Further, an address code may represent a province or may represent a municipality, that is, may be arbitrarily set. Further, when an address code serving as user's attribute information is not included in the position information, all users may be assumed to have the same attribute, and the same contract rate mask value may be used.

Further, the aggregating unit 127 aggregates correction values of position information corresponding to the positions in the aggregation areas of a plurality of predetermined aggregation areas which are set in advance based on all pieces of position information to which a correction value is added. As a result, it is possible to aggregate the actual population distribution for a plurality of predetermined aggregation areas. Specifically, the aggregating unit 127 aggregates correction values of aggregation areas "area 1," "area 2," "area 3," "area 4," and the like in a time zone "1:00 to 3:00" of an aggregation target. Then, the information transmitting unit 128 transmits aggregation result information to the information display device 6. FIG. 7 is a diagram illustrating an example of a data configuration of aggregation result information aggregated by the aggregating unit 127.

Further, at this time, the aggregating unit 127 may aggregate attribute information or an address code. For example, when it is desired to know the population of the ages of "0 to 4" of the address code "10101010," correction values of position information in which an address code is "10101010" and an age corresponds to "0" to "4" are aggregated.

Figure 8:
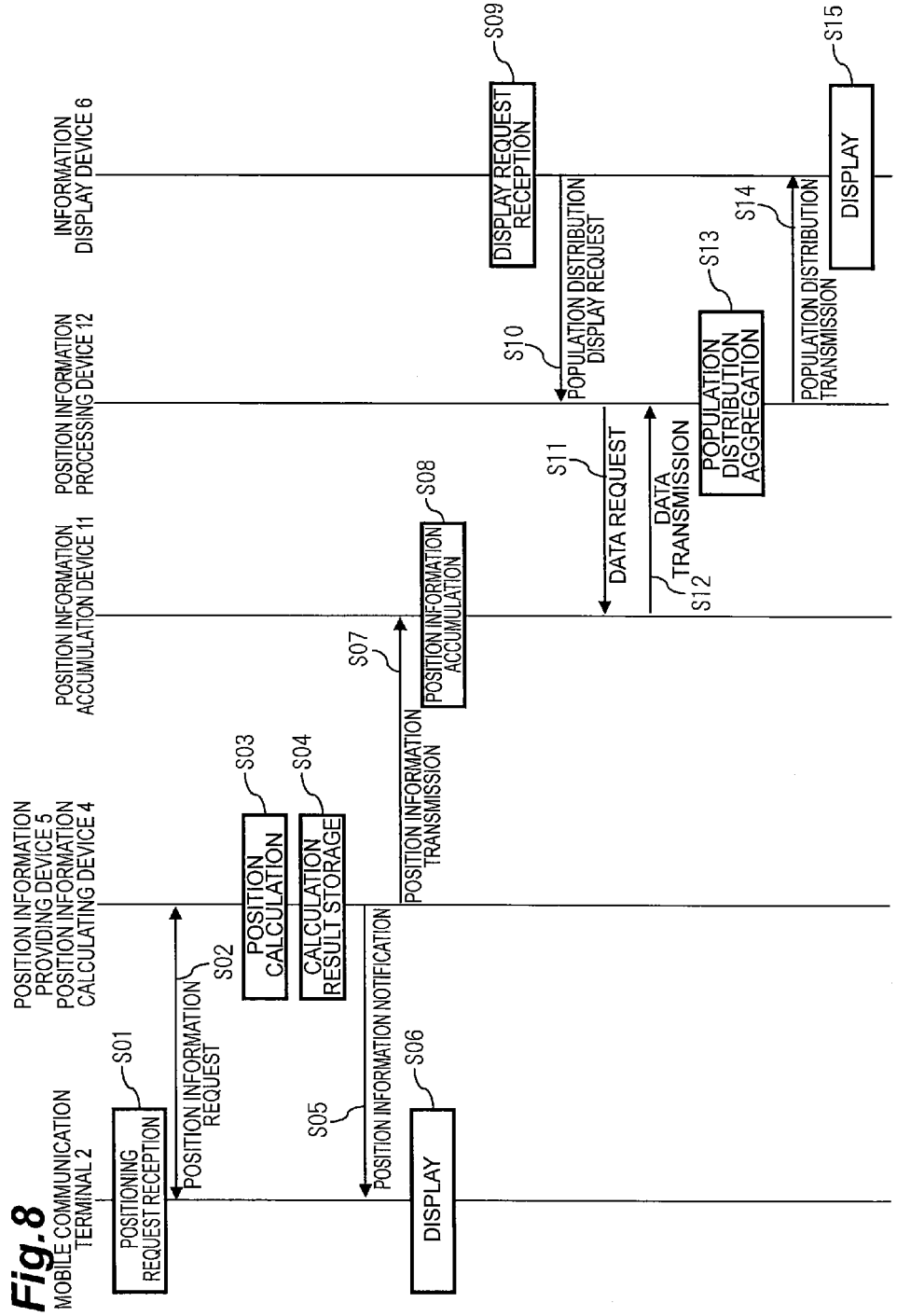
FIG. 8 is a sequence diagram illustrating a position information aggregation method by a position information aggregation device of FIG. 1.
Figure 9:
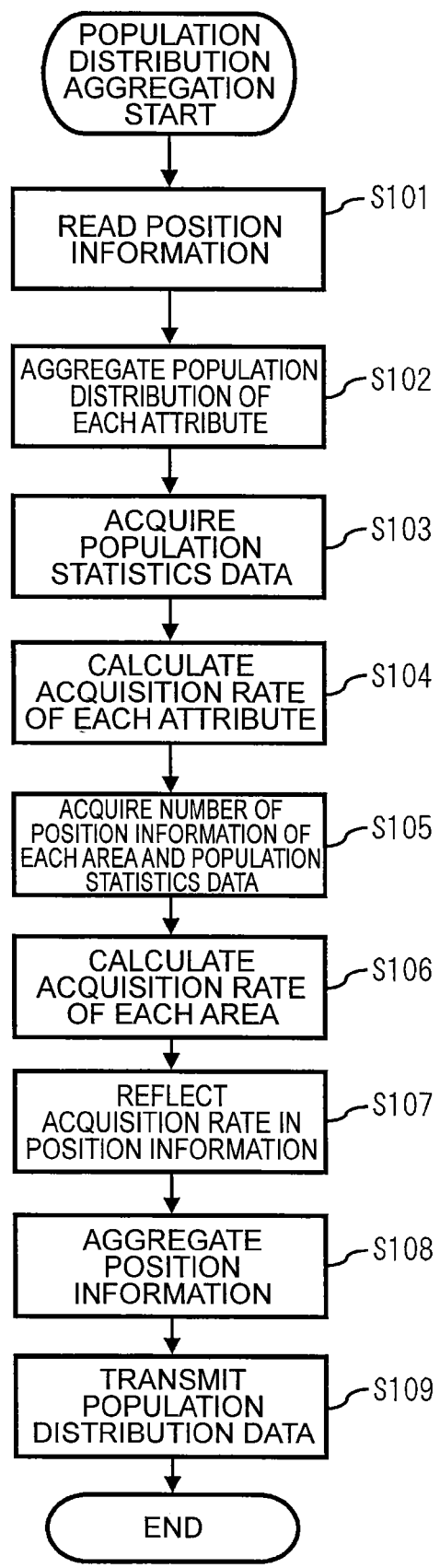
FIG. 9 is a flowchart illustrating an operation at the time of population distribution aggregation process of FIG. 8.

Next, an operation of the position information aggregation system 1 and a position information aggregation method in a position information aggregation device will be described with reference to FIGS. 8 and 9. FIG. 8 is a sequence diagram illustrating an operation at the time of position information aggregation by the position information aggregation system 1, and FIG. 9 is a flowchart illustrating an operation at the time of a population distribution aggregation process by a position information aggregation device.

Referring to FIG. 8, first, when the positioning request is received from the user of the mobile communication terminal 2 (step S01), the mobile communication terminal 2 collects information necessary for a positioning calculation, and transmits the information and a position information request signal to the position information providing device 5 (step S02). At this time, the position information calculating device 4 executes the positioning calculation on the mobile communication terminal 2 (step S03), and the position information of the mobile communication terminal 2 is stored in the position information providing device 5 (step S04). Next, the stored position information is transmitted from the position information providing device 5 to the mobile communication terminal 2 (step S05), and is output on the display device of the mobile communication terminal 2 in various display forms (step S06).

Meanwhile, the position information of the mobile communication terminal 2 stored in the position information providing device 5 is notified to the mobile communication terminal 2, and transmitted to the position information accumulation device 11 (step S07). Then, the position information is accumulated in the position information accumulating unit 112 of the position information accumulation device 11 (step S08).

Thereafter, the information display device 6 receives a display request related to the population distribution (step S09). At this time, request information requesting aggregation of information related to the population distribution, which includes time zone information or area information is transmitted from the information display device 6 to the position information processing device 12 (step S10). Further, a position information reference request is transmitted from the position information processing device 12 to the position information accumulation device 11 (step S11), and thus the position information is read out from the position information accumulation device 11 to the position information processing device 12 (step S12). Next, the position information processing device 12 aggregates the population distribution of a predetermined area based on the read position information (step S13). Then, population distribution data is transmitted from the position information processing device 12 to the information display device 6 (step S14), and is displayed in various output forms such as a map form or a graph form (step S15).

Next, the details of the population distribution aggregation process by the position information processing device 12 will be described with reference to FIG. 9. First, the position information processing device 12 reads position information from the position information accumulation device 11 (step S101). Thereafter, the position information processing device 12 aggregates user population pyramid data of the mobile communication terminal 2 according to an age and a gender in a broad area based on position information extracted by the position information acquiring unit 122 (step S102). Further, the position information processing device 12 acquires population pyramid data in a predetermined broad area from the statistics data storage unit 124 (step S103). Then, the position information processing device 12 calculates a reciprocal number of a position information acquisition rate by the mobile communication terminal 2 on the actual population of each attribute based on user population pyramid data and pyramid data (step S104).

Thereafter, the position information processing device 12 acquires user population pyramid data of the mobile communication terminal 2 of each address code (narrow area) by aggregating position information, and acquires population statistics data of each address code in a broad area from the statistics data storage unit 124 (step S105). Thereafter, the position information processing device 12 calculates the ratio of the population statistics data and the user population pyramid data, and calculates a reciprocal number of a position information acquisition rate of the mobile communication terminal 2 of each narrow area and a correction value thereof (step S106). Here, when a position information acquisition rate of an attribute other than an address code is calculated, the position information processing device 12 repeats the process of step S106.

Next, the position information processing device 12 adds a correction value in which the reciprocal number of the position information acquisition rate corresponding to the attribute to all pieces of position information is reflected (step S107). Further, when the position information acquisition rates of two or more types of attributes are generated, the position information processing device 12 multiplies the position information by the reciprocal numbers of the position information acquisition rates of two or more types. Thereafter, the position information processing device 12 aggregates the position information to which the correction value is aggregated according to an aggregation area and an arbitrary attribute, and generates aggregation result information serving as population distribution data (step S108). Then, the position information processing device 12 transmits the aggregation result information to the information display device 6 (step S109).

Figure 10:
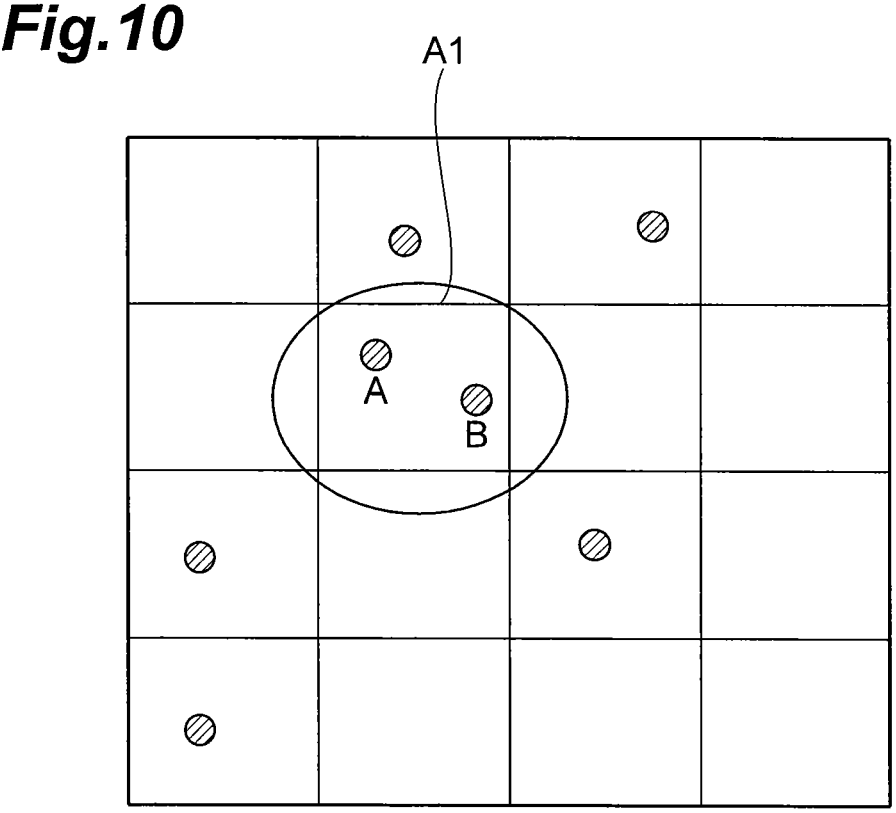
FIG. 10 is a conceptual diagram illustrating an aggregation unit of position information by a position information processing device of FIG. 1.
Figure 11:
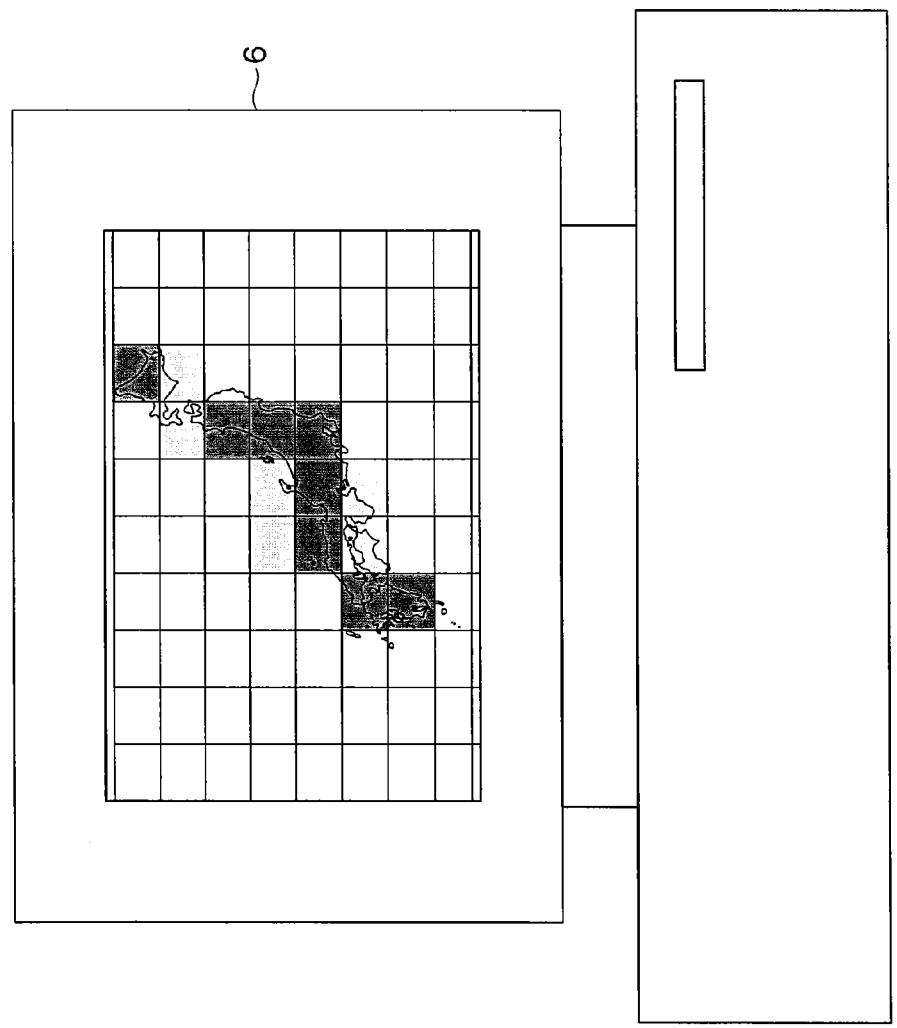
FIG. 11 is a diagram illustrating a population distribution displayed on an information display device 6 of FIG. 1.

FIG. 10 is a conceptual diagram illustrating an aggregation unit of position information by the position information processing device 12 in step S108. As illustrated in FIG. 10, population data in an aggregation area A1 is aggregated by adding correction values of position information A and B representing positioning within the aggregation area A1. FIG. 11 is a diagram illustrating a population distribution output screen displayed on the information display device 6 in step S15. Here, when an aggregation range designated through the information display device 6 is "all over Japan," the population distribution of each of aggregation areas obtained by dividing the whole of Japan is visually displayed by a color or concentration.

Here, when a time to estimate the population changes, the process of aggregating a series of position information described above needs to be newly executed again. For example, a position information acquisition rate of one o'clock to three o'clock and a position information acquisition rate of two o'clock to four o'clock differ in operating rate associated with a power status of the mobile communication terminal 2, and thus a position information acquisition rate needs to be calculated again. In this regard, the position information processing device 12 may calculate a position information acquisition rate again in each processing time zone. In this case, it is possible to avoid influence of an on/off state change of power of the mobile communication terminal 2 on population estimation data.

According to the position information aggregation device and the position information aggregation method described above, position information related to the mobile communication terminal 2, which includes a user ID and attribute information containing address information related to the user, is received, a position information acquisition rate of each attribute such as the user's address is calculated based on population statistics data of each narrow area in a broad area and the received position information, and position information belonging to a specific area in which a position information acquisition rate corresponding to attribute information such as an address is reflected is aggregated. Thus, even when position information that differs in use frequency of a position information service according to the user's address, age, or gender becomes a target, by preparing statistics data of each area in a broad area such as the whole of Japan based on population census data or the like in advance, it is possible to reflect the distribution of actual users in the population distribution of a specific area with a high degree of accuracy. For example, it is possible to reflect the tendency that old people in the country are relatively low in possession rate of mobile phones in the population distribution.

Further, by aggregating position information while repeatedly reflecting position information acquisition rates of two or more types of attributes corresponding to attribute information of position information, when two or more attributes such as an age, a gender, and address of the user of the mobile communication terminal 2 differ in the acquisition frequency of position information, it is possible to reflect acquisition rates of two or more attributes in position information to be aggregated using population statistics data of two or more attributes which are prepared in advance. As a result, it is possible to obtain the more accurate population distribution of each area.

<First Modified Example of First Embodiment>

Next, a first modified example of a first embodiment will be described in connection with the difference with the first embodiment. In the first embodiment, the acquisition rate calculating unit 123 repeatedly calculates position information acquisition rates of two or more types of attributes of a plurality of mobile communication terminals using population statistics data and position information, and the aggregating unit 127 aggregates position information while repeatedly reflecting the position information acquisition rates of two or more types of attributes corresponding to attribute information of position information in position information. However, in the present modified example, the aggregating unit 127 can aggregate position information without performing the repeatedly calculating or reflecting process in the acquisition rate calculating unit 123 and the aggregating unit 127. Specifically, the acquisition rate calculating unit 123 aggregates the number of users corresponding to an attribute of a desired population based on position information acquired from the position information acquiring unit 122. Further, the acquisition rate calculating unit 123 calculates the population of a desired attribute based on population census data stored in the statistics data storage unit 124. Then, the acquisition rate calculating unit 123 calculates a reciprocal number (an acquisition rate mask) of a position information acquisition rate based on the ratio of the calculated number of users and the population. Similarly to the first embodiment, the aggregating unit 127 adds the calculated acquisition rate mask to the position information corresponding to the population of the desired attribute. Then, the aggregating unit 127 calculates the population of the desired attribute based on the acquisition rate mask. For example, it is possible to select and use a desired attribute from a gender, an age, an address code, and the like as an attribute used to aggregate the number of users based on the position information acquired from the position information acquiring unit 122 or to calculate the population based on population census data.

<Second Modified Example of First Embodiment>

Next, a second modified example of the first embodiment will be described. In the first embodiment, the acquisition rate calculating unit 123 and the aggregating unit 127 calculate the number of users (the population) in a predetermined area by aggregating position information. The position information acquiring unit 122 extracts information matching with request information from an information display device as the position information. In the present modified example, the position information acquiring unit 122 changes an extracting technique of extracting position information.

In the present modified example, the position information acquiring unit 122 extracts position information matching with time zone information and area information included in request information from among position information read from the position information accumulating unit 112. A concrete extracting method will be described later. In detail, through an extracting method which will be described later, in at least a part of a time zone (hereinafter, referred to as a "aggregation time zone") of an aggregation target represented by time zone information, the position information acquiring unit 122 implements a function of extracting one position information generated within the aggregation time zone or an extension time period which will be described later, based on the mobile communication terminal 2 estimated to stay in a predetermined area represented by area information or a positioning process of the mobile communication terminal 2.

The acquisition rate calculating unit 123 and the aggregating unit 127 aggregates the position information extracted by the position information acquiring unit 122, and estimates the aggregation result as an entering terminal number of a predetermined area within the aggregation time zone. In this disclosure, the entering terminal number refers to a unique mobile communication terminal 2 that stays in an area serving as an aggregation target in at least a part of an aggregation time zone. Here, "unique" means a number after an overlapping count of the same mobile communication terminal 2 is excluded.

[Entering Terminal Number Estimating Process]

Next, an example of the entering terminal number estimating process performed by the position information acquiring unit 122 will be described. For example, the entering terminal number is obtained using an estimation stay time period of each mobile communication terminal 2 in a predetermined area represented by area information included in request information.

The position information acquiring unit 122 calculates an estimation stay time period of each mobile communication terminal which has stayed in an predetermined area in which a mobile communication terminal stays, based on area inside position data representing the inside of a predetermined area corresponding to an address code in which an acquisition time of position information is within an extension time period which will be described later in position information having the same user ID and area outside position data representing the outside of a predetermined area corresponding to an address code, adjacent to the area inside position data when arranged in time series in order of acquisition times of position information. Here, the "extension time period" means a time period obtained by extending, for example, an aggregation time zone back and forth by a predetermined time length (for example, one hour), that is, a time zone in which a time obtained by going back to the past from an aggregation start time t0 by a predetermined time is set as a start point, and a timing obtained by going forth to the future from an aggregation end time t1 by a predetermined time is set as an end point.

Figure 12:
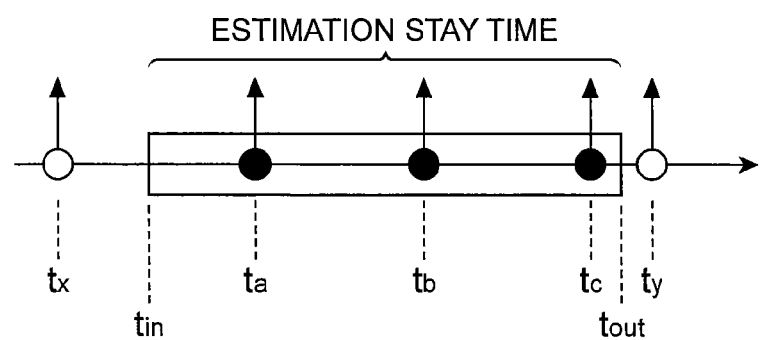
FIG. 12 is a diagram for describing an estimation stay time calculating method.

As illustrated in FIG. 12, when a series of pieces of position information related to the same mobile communication terminal which is acquired within an extension time period are arranged in time series in order of acquisition times of position information, area inside position data representing the inside of a predetermined area corresponding to an address code of position information is indicated by a black circle, and area outside position data representing the outside of a predetermined area corresponding to an address code adjacent to the area inside position data is indicated by a white circle, a time $t_{in}$ corresponding to a divisional point (for example, a middle point) between an acquisition time $t_a$ of area inside position data which is earliest in time series and an acquisition time $t_x$ of area outside position data adjacent to the earliest area inside position data is set as a start time of the estimation stay time period. Similarly, a time $t_{out}$ corresponding to a divisional point (for example, a middle point) between an acquisition time $t_c$ of area inside position data which is latest in time series and an acquisition time $t_y$ of area outside position data adjacent to the latest area inside position data is set as an end time of the estimation stay time period. Thus, a time represented by a rectangular shape in FIG. 12, that is, a time period from the time $t_{in}$ to the time $t_{out}$ is calculated as the estimation stay time period of the mobile communication terminal.

Figure 13:
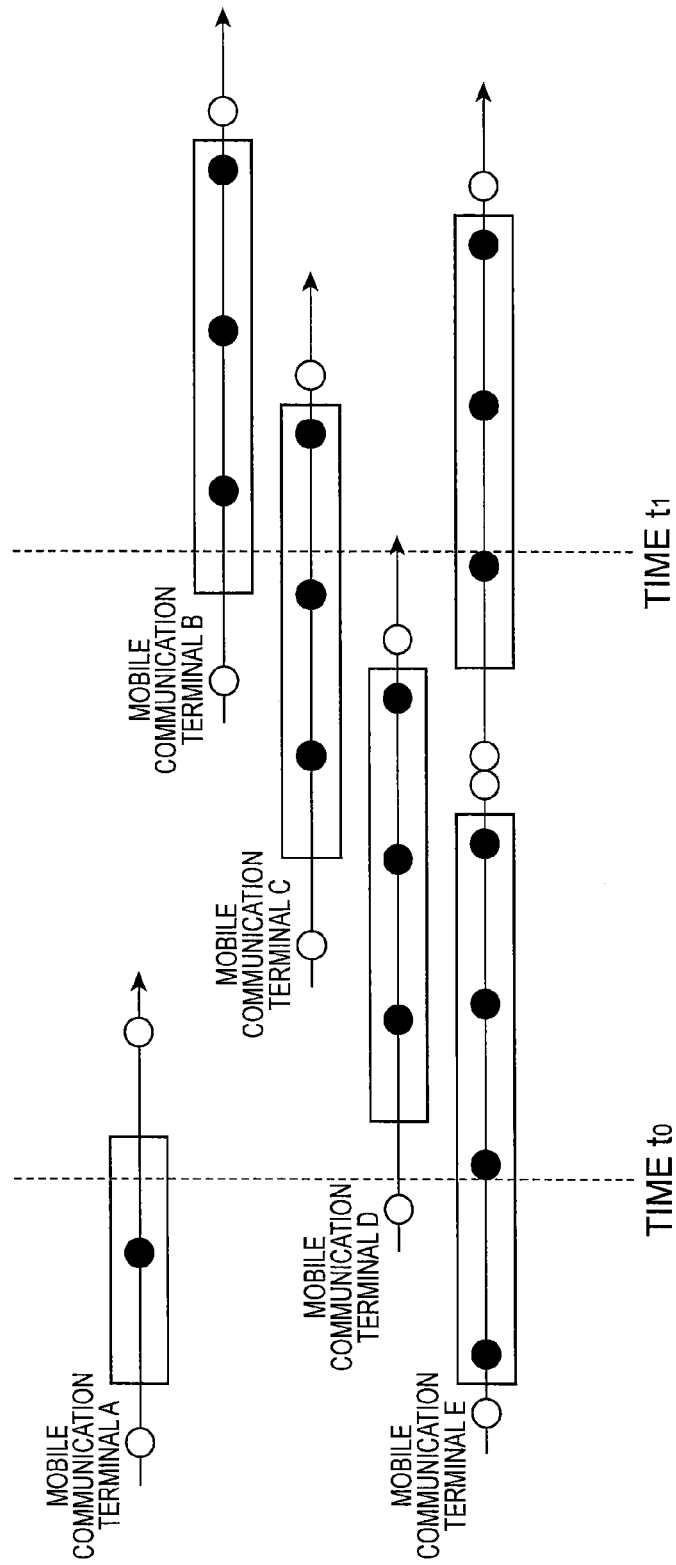
FIG. 13 is a diagram for describing a position information extracting method.

Then, the position information acquiring unit 122 extracts a mobile communication terminal in which the calculated estimation stay time period overlaps the aggregation time zone. FIG. 13 is a diagram illustrating that a series of pieces of position information related to mobile communication terminals A to E acquired within an extension time period are arranged in order of acquisition times of position information in time series in a horizontal-axis direction for each mobile communication terminal. In FIG. 13, area inside position data representing the inside of a predetermined area corresponding to an address code is indicated by a black circle, and area outside position data representing the outside of a predetermined area corresponding to an address code is indicated by a white circle. Here, when only area inside position data in which an acquisition time of position information is within an aggregation time zone (a time t0 to a time t1) is focused, the three mobile communication terminals C to E are extracted as corresponding mobile communication terminals.

Meanwhile, the estimation stay time period represented by a rectangular shape in FIG. 13 overlaps the aggregation time zone (the time t0 to the time t1) in the five mobile communication terminals A to E, and thus the position information acquiring unit 122 extracts the five mobile communication terminals A to E. Thus, except when only the area inside position data indicated by a black circle is focused, the mobile communication terminals A and B are also estimated to stay in a predetermined sector at a certain point in time of the aggregation time zone. Here, the method using the above-described estimation stay time period is an example, and another method may be employed.

The position information extracted by the position information acquiring unit 122 in the above-described way is used when the acquisition rate calculating unit 123 or the aggregating unit 127 calculates the number of users (the population) based on the position information. By extracting the position information in the above-described way, it is possible to extract position information used to obtain the number of users (the population) with a high degree of accuracy, and it is possible to improve the accuracy of the calculated number of users (the population).

<Second Embodiment>

Next, a position information aggregation system 1 according to a second embodiment will be described. In the second embodiment, the population distribution is calculated using an attribute of the user who actually uses the mobile communication terminal 2. For example, in the first embodiment, the population distribution of each attribute is calculated based on an attribute registered at the time of contract of the mobile communication terminal 2 (for example, a mobile terminal). However, a contractor does not become necessarily the user. For example, when a person under age is the user, a contractor is likely to be a guardian. In this case, the population distribution of people under age is remarkably lowered, and it is difficult to properly calculate the population distribution. In the second embodiment, the population distribution is calculated based on the actual user's attribute.

Figure 14:
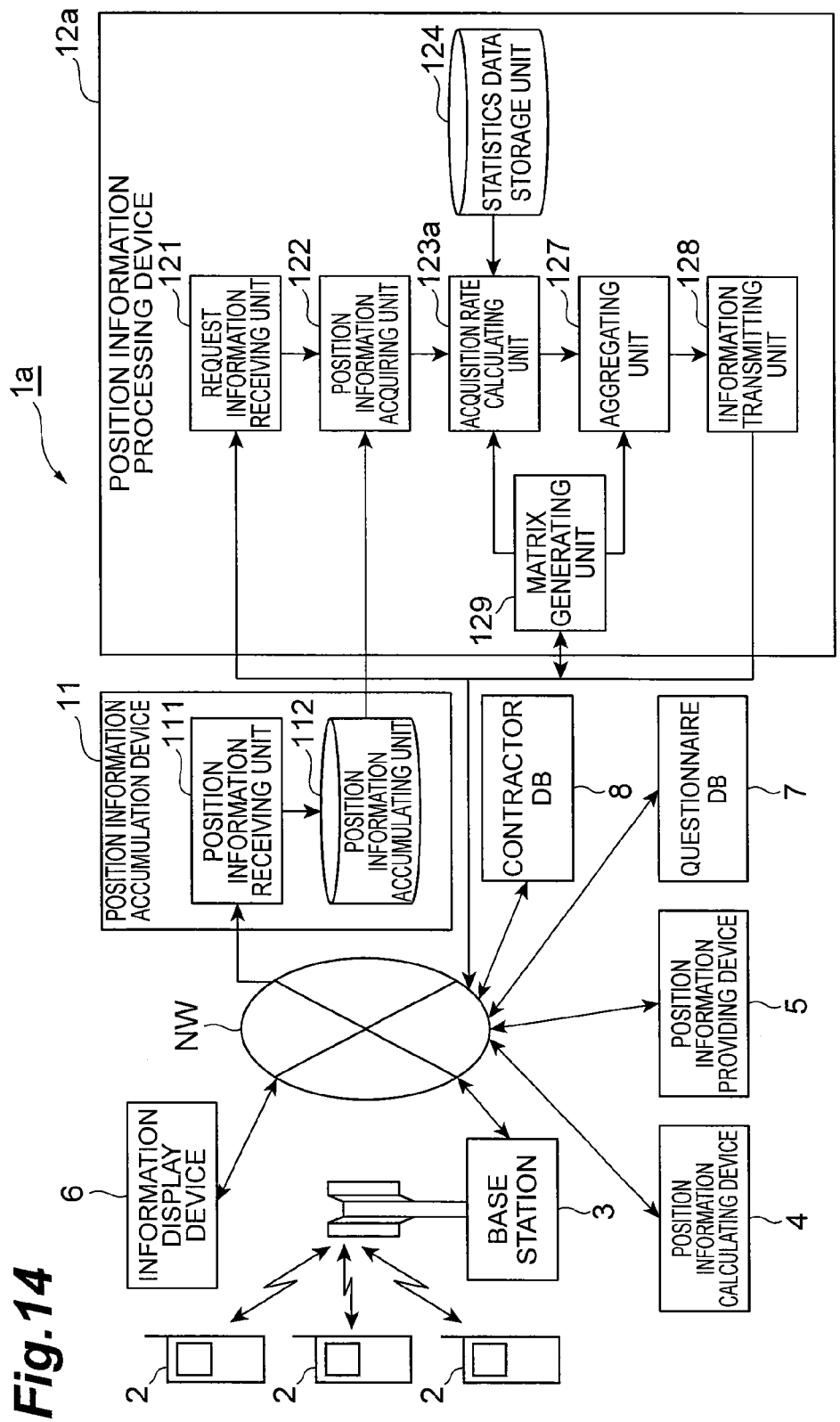
FIG. 14 is a schematic configuration diagram of a position information aggregation system according to a second embodiment.

FIG. 14 is a schematic configuration diagram of a position information aggregation system 1a according to the present embodiment. The second embodiment is different from the first embodiment in that a questionnaire DB 7 and a contractor DB 8 are provided, and a position information processing device 12a has a functional configuration of calculating the population distribution based on the actual user's attribute. Hereinafter, the present embodiment will be described in connection with the different points.

The questionnaire DB 7 is a portion that stores a result based on questionnaire data performed on a contractor. In the questionnaire, the contractor or the user is required to write the actual user's attribute information, and, for example, the contractor is required to write a user ID (which may be a simple ID), a user name, a gender, an age, and an address (or an address code).

The contractor DB 8 is a portion that stores attribute information based on contractor data registered at the time of purchase of the mobile communication terminal 2, and, for example, stores a user ID (which may be a simple ID), a gender, an age, and an address (or an address code) in association with each other.

The position information processing device 12a is the same in function as the position information processing device 12 according to the first embodiment. However, the position information processing device 12a calculates the appropriate population based on the actual user's attribute (questionnaire information of the questionnaire DB) as described above, and, specifically, includes a matrix generating unit 129 (a generating section). Further, the acquisition rate calculating unit 123a corrects the population of each attribute using an inverse matrix generated by the matrix generating unit 129, and performs aggregation using the inverse matrix. In other words, the number of contractors of each attribute is calculated by counting position information corresponding to a certain aggregation area based on an attribute associated with contractor information, and the number of users based on an actual attribute is calculated by correcting the number of contractors using the inverse matrix generated by the matrix generating unit 129 with respect to the number of contractors of each attribute. Hereinafter, the description will proceed in connection with the different points from the position information processing device 12 according to the first embodiment.

The matrix generating unit 129 is a portion that generates a transition matrix representing a transition state representing an attribute of a contractor that is associated with an actual user based on questionnaire data and contractor data respectively stored in the questionnaire DB 7 and the contractor DB 8. A further detailed description will be made below.

Figure 15:
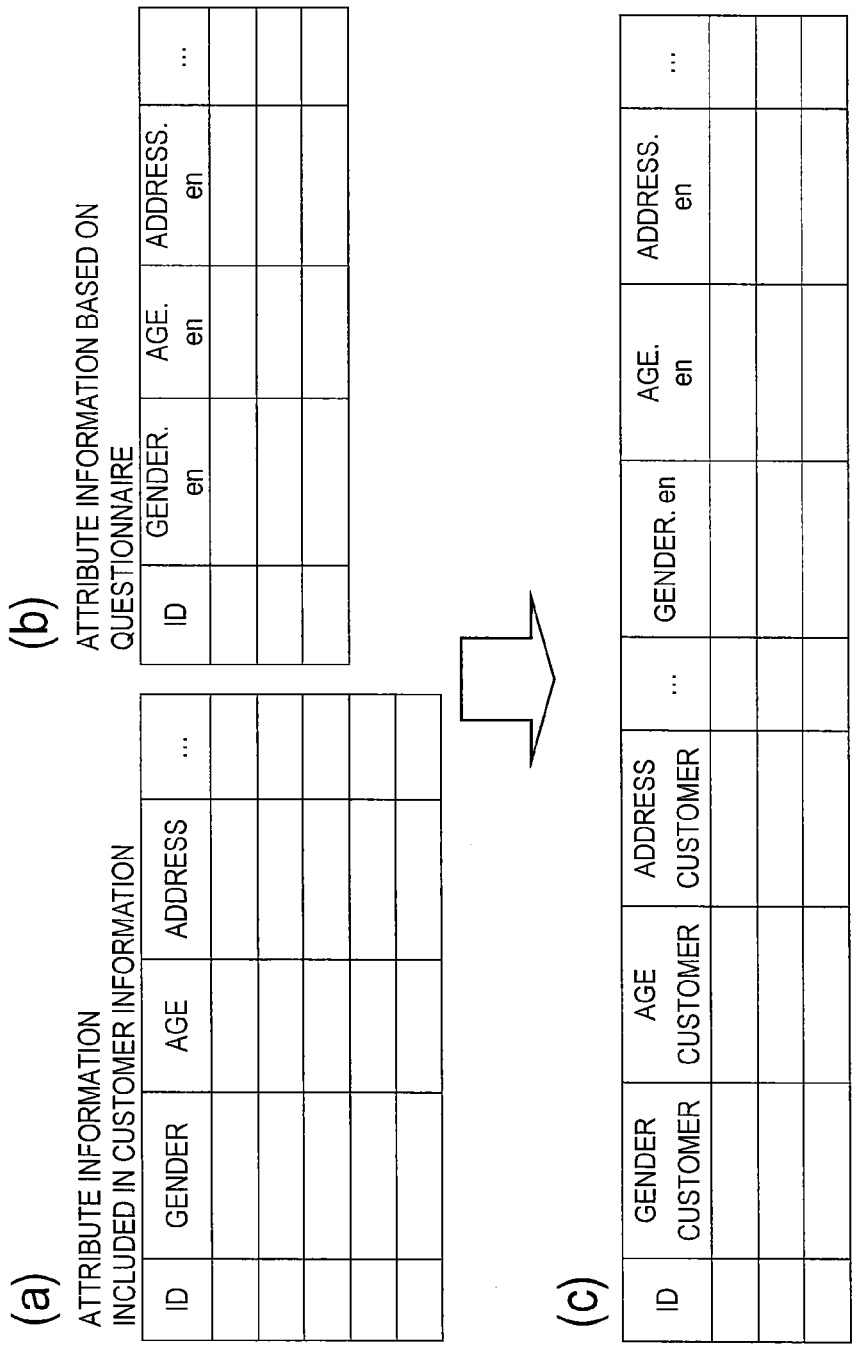
FIG. 15 is an explanatory diagram illustrating a process of generating a conjunctive management table based on contractor data and questionnaire data.

FIG. 15 is an explanatory diagram illustrating a process of generating a conjunctive management table based on contractor data and questionnaire data. FIG. 15(a) illustrates a contractor attribute information management table registered at the time of contract, and a gender, an age, and an address are stored in association with a user ID. FIG. 15(b) illustrates a user attribute information management table by a questionnaire, and a gender, an age, and an address are stored in association with a user ID. The same attribute information items are stored. The matrix generating unit 129 connects the management tables using a user ID as a key and generates a conjunctive management table used to understand a transition state. FIG. 15(c) is an explanatory diagram of a conjunctive management table obtained by the above connection. Each attribute information is an example, and various kinds of other items may be stored. For example, a preference, a hobby, and an occupation may be stored.

The matrix generating unit 129 generates a transition matrix representing a transition state from an actual user's attribute information to a contractor's attribute information according to the generated conjunctive management table. FIG. 16 is an explanatory diagram illustrating a transition state. FIG. 16 illustrates a ratio of an attribute of a contractor associated with an actual user according to an attribute. For example, the explanatory diagram illustrated in FIG. 16 is derived such that a ratio of a contractor attribute to a user according to an attribute is calculated by sorting the conjunctive management table illustrated in FIG. 15(c) according to a certain attribute. For example, sorting is performed in priority order of "age.en" and "gender.en" representing attributes of an age and a gender of the actual user obtained from questionnaire data, the number of each attribute (age/gender) of the contractor is aggregated according to an age and a gender of the actual user in questionnaire data, and thus it is possible to understand the transition state representing an attribute of a contractor that is associated with each attribute of an actual user.

FIG. 16 illustrates an example in which a ratio that a user is "age of 0, male" and a contractor is "age of 30, male" is 0.1, and a ratio that a user is "age of 0, male" and a contractor is "age of 30, female" is 0.2. In short, when a baby is a user, a ratio that an actual contractor is an attribute representing a guardian (parent) is high. On the contrary, although not illustrated, when a user is "age of 18, male," a ratio that a contractor is an attribute of "age of 18, male" representing himself/herself or an attribute representing a man/woman in his/her forties or fifties representing a guardian is high.

Figure 17:
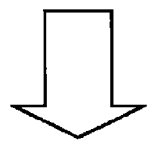
FIG. 17 is an explanatory diagram illustrating a transition matrix A and an inverse matrix $A^{-1}$.

Here, when the transition matrix is generated under the above assumption, a transition matrix A illustrated in FIG. 17(a) can be generated. FIG. 17 is an explanatory diagram illustrating a transition matrix A and an inverse matrix $A^{-1}$. The transition matrix A includes a 142×142 matrix and satisfies Y=AX. Here, X represents a number (the number of users) classified according to an actual age and an actual gender, and Y represents a number (the number of contractors) classified to an age and a gender based on contract information. Hereinafter, the transition matrix A when an age and a gender are used as attribute information is referred to as a transition matrix $A_1$. The number of elements of the 142×142 matrix is an example in which an attribute of a contractor and a user is classified into the ages of 0 to 69 and the ages of 70 or more, and is not limited to this example. Here, when the elements are classified according to an age period such as 10's and 20', the number of rows and the number of columns change.

Further, when the population distribution in a certain aggregation area is calculated based on position information or the like as in the present embodiment, since the number of contractors is known but an actual user is not known, the inverse matrix $A_1^{-1}$ of the transition matrix $A_1$ is calculated, and thus it is possible to calculate the population distribution of the actual user based on the number of contractors using the inverse matrix $A_1^{-1}$.

In other words, $$A_1^{-1}Y = A_1^{-1}AX$$

$$X = A_1^{-1}Y \quad (1)$$

As expressed in Formula (1), the inverse matrix $A_1^{-1}$ is calculated. Using the inverse matrix $A_1^{-1}$, it is possible to calculate the number of users based on the number of contractors, and it is possible to calculate a numerical number closer to the population distribution of the actual user attribute.

Further, even when a transition matrix on an attribute other than an age and a gender is obtained, the above-described process is similarly performed. For example, when a transition matrix $A_2$ on an address code is obtained, a questionnaire survey is performed on a contractor or a user, and a conjunctive management table for an address code is generated by connecting questionnaire data with contractor data (corresponding to FIG. 15(c)). Then, a transition state of an address code is aggregated according to an area representing an actual address (residence) (corresponding to FIG. 16), and a ratio of an address of a contractor associated with an actual user is calculated. Then, the transition matrix $A_2$ can be calculated by the process expressed in Formula (1).

The transition matrices $A_1$ and $A_2$ are exemplary, and a matrix on any other attribute may be calculated and used. In addition, the transition matrix is not limited to two types, and one type or three or more types of transition matrices may be calculated and used as necessary.

A process of calculating the population distribution using the inverse matrix $A_1^{-1}$ generated in the above-described way will be described in detail. FIG. 18 is an explanatory diagram illustrating a process of generating an acquisition rate mask of each attribute (an age and a gender) using the inverse matrix $A_1^{-1}$. FIG. 18(a) is an explanatory diagram illustrating the number of contractors according to an age and a gender among attributes. The number of contractors is a numerical value obtained by counting position information, and information stored in the position information accumulating unit 112. It is possible to calculate the number of actual users (or the number of users considered as being close to an actual numerical value) according to an age and a gender by applying the inverse matrix $A_1^{-1}$ to the number of contractors according to an age and a gender (FIG. 18(b)). Further, similarly to the first embodiment, an acquisition rate of each attribute (an age and a gender) is calculated using population statistics data (population pyramid data) obtained through a population census or the like based on the number of actual users. Then, a reciprocal number is calculated based on the calculated acquisition rate, and stored as an acquisition rate mask (FIG. 18(c)). The conversion process from FIG. 18(b) to FIG. 18(c) is similar to that described in the first embodiment.

Further, even when an address code is used as an attribute, the same process is performed. FIG. 19 is an explanatory diagram illustrating a process of generating an acquisition rate mask of each attribute (address code) using the inverse matrix $A_2^{-1}$. FIG. 19(a) is an explanatory diagram illustrating the number of users of each address code among attributes, and illustrates information stored in the position information accumulating unit 112. It is possible to calculate the number of actual users (or the number of users close to an actual numerical value) of each address code by applying the inverse matrix $A_2^{-1}$ to the number of contractors of each address code (FIG. 19(b)). Further, similarly to the first embodiment, an acquisition rate of each attribute (address code) is calculated using population statistics data (population pyramid data) obtained through a population census or the like based on the number of actual users. Then, a reciprocal number is calculated based on the calculated acquisition rate, and stored as an acquisition rate mask (FIG. 19(c)). In addition, in the process on an address code, similarly to the first embodiment, a correction value of acquisition rate mask data is calculated by further multiplying a value obtained by dividing the total number of pieces of position information in a broad area by the total number of pieces of population statistics data in a broad area, and output to the aggregating unit 127. This is similar to the process when FIG. 5 is obtained in the first embodiment.

Furthermore, the acquisition rate calculating unit 123 generates a correction table illustrated in FIG. 20 by performing the following process. FIG. 20 is an explanatory diagram illustrating a correction table. The correction table is a table in which a correction value is associated with an age, a gender, and an address code. The correction table is generated such that a correction value is calculated by multiplying the acquisition rate masks of the table of the acquisition rate mask illustrated in FIG. 18(c) and the table storing the correction value obtained from the acquisition rate mask illustrated in FIG. 19(c) (corresponding to FIG. 5), and the correction value is associated with attribute information (an age, a gender, and an address code) through the acquisition rate calculating unit 123. The correction table is temporarily stored in the acquisition rate calculating unit 123. In the first embodiment, position information is further stored in association with the attribute information and the correction value. However, in the second embodiment, a separate table is provided for the sake of an effective process. Further, similarly to the first embodiment, the correction value may be stored in association with the position information management table. In addition, the effective process may be implemented by applying the correction table (FIG. 20) according to the second embodiment to the position information processing device 12 according to the first embodiment.

Next, the acquisition rate calculating unit 123 generates interim data used as a source of the aggregation process using the generated correction value. FIG. 21 is an explanatory diagram illustrating a process of generating interim data. FIG. 21(a) is a diagram illustrating a correspondence table of position information associated with each contractor stored in the position information accumulating unit 112. As illustrated in FIG. 21(a), a user ID, time information, position information, and attribute information such as a gender, an age, an occupation, and an address code are associated. An interim table storing interim data used to calculate the number of users is generated based on the correspondence table.

FIG. 21(b) is an explanatory diagram illustrating the interim table. As illustrated in FIG. 21(b), the acquisition rate calculating unit 123 calculates the number of contractors according to an aggregation target time period, an aggregation area, and attribute information (a gender, an age, and an address code). The number of contractors is a numerical value obtained by counting the number of pieces of position information. Then, an inverse matrix used to obtain an acquisition rate mask is used for the number of contractors of each attribute in the interim table. Here, since the two types of inverse matrices are used, correction from the number of contractors to the number of users is made using the inverse matrix $A_1^{-1}$ and the inverse matrix $A_2^{-1}$ calculated in the above-described way. Specifically, first, the acquisition rate calculating unit 123 generates a correction interim table by calculating the number of actual users of each age and a gender by multiplying the number of contractors of each age and gender by the inverse matrix $A_1^{-1}$ (FIG. 21(c)). Further, one inverse matrix is used when the type of inverse matrix is one as described above, and three or more types of inverse matrices are used when the type of inverse matrix is three or more.

Specifically, when the number of actual users on the number of contractors of each age and gender serving as attribute information is calculated, the number of users of each actual attribute can be calculated such that sorting is performed according to an aggregation target time period, an aggregation area, and an address code in the interim table, and then the number of contractors of each age and gender is multiplied by the inverse matrix $A_1^{-1}$ generated for an age and a gender. Further, the inverse matrix $A_1^{-1}$ is multiplied for each of combinations of an aggregation target time period, an aggregation area, and an address code, and for example, when there are 10 combinations, the number of users corresponding to 10 combinations is calculated. Similarly, even when the number of users is calculated for each address code, the number of users is calculated such that sorting is performed according to attribute information of a gender and an age which is attribute information other than an aggregation target time period, an aggregation area, and an address code, and the inverse matrix $A_2^{-1}$ is applied. The inverse matrix used to calculate an acquisition rate of the above-described address code is calculated as the inverse matrix $A_2^{-1}$.

In the above-described way, an aggregation table in which a correction value is further associated with the number of users corrected according to an age, a gender, and an address code is generated. FIG. 22(a) illustrates a concrete example of the aggregation table which is generated such that the correction value described in the correction table illustrated in FIG. 20 is associated with each attribute. For example, in FIG. 20, a correction value including a combination of a gender: male, an age: 0, and an address code: 10101010 is associated with the same combination in the correction table. In calculating the actual population distribution, as illustrated in FIG. 22(b), the population of each attribute such as an aggregation target time period and an aggregation area can be calculated by multiplying the number of users by the correction value.

It is possible to calculate various population distribution information by aggregating the population calculated in FIG. 22(b) according to an arbitrary condition of an operator. FIG. 22(c) illustrates a concrete example. In FIG. 22(c), the population distribution of each aggregation area in an aggregation target time zone of 1:00 to 3:00 is calculated.

In the above-described way, it is possible to calculate the number of users based on an attribute of an actual user other than the number of contractors based on an attribute of contract information registered at the time of contract.

Figure 23:
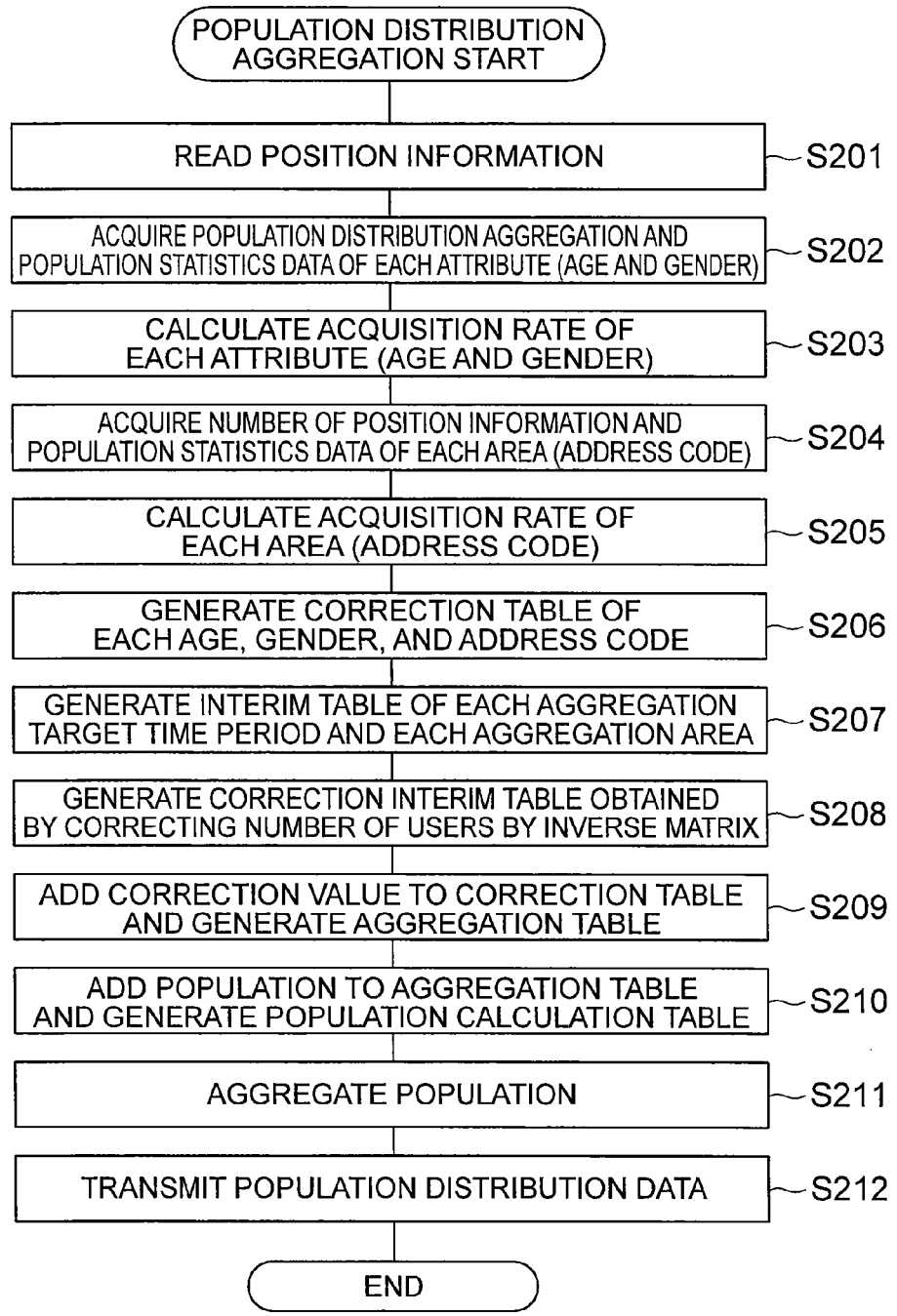

Next, the process of the position information aggregation system 1a according to the present embodiment will be described. FIG. 23 is a flowchart illustrating the process of the position information aggregation system 1a.

First, through the position information acquiring unit 122, position information stored in the position information accumulating unit 112 is read in, and the inverse matrix $A_1^{-1}$ and the inverse matrix $A_2^{-1}$ of the transition matrices $A_1$ and $A_2$ are calculated according to a reading timing (S201). Then, the population distribution (the number of users) of each actual attribute is calculated by aggregating the population distribution of each attribute and applying the inverse matrix $A_1^{-1}$ to the population distribution (FIG. 18(b)), and population statistics data is acquired from the acquisition rate calculating unit 123 (S202). Then, an acquisition rate (FIG. 18(c)) of each attribute (here, an age and a gender) is calculated based on the population distribution and the population statistics data (S203). Further, through the acquisition rate calculating unit 123, population distribution (the number of users) of each actual address code is calculated by aggregating the number of pieces of position information of each area based on an address code and applying the inverse matrix $A_2^{-1}$ to the number of pieces of position information (FIG. 19(b)), and population statistics data is acquired (S204). Then, an acquisition rate (FIG. 19(c)) of each area based on an address code is calculated (S205). Then, the acquisition rate calculating unit 123 generates the correction table (FIG. 20) according to an age, a gender, and an address code based on the acquisition rate (S206).

Meanwhile, the acquisition rate calculating unit 123 generates the interim table (FIG. 21(b)) representing the number of contractors according to an aggregation target time period and an aggregation area based on the position information read in S201 (S207). The correction interim table (FIG. 21(c)) including the calculated number of users can be generated by multiplying the interim table by the inverse matrix $A^{-1}$. This process is performed for each of combinations of an aggregation target time period, an aggregation area, and an address code (S208).

Then, the aggregation table (FIG. 22(a)) is generated based on the correction interim table (S209). This table is one in which the correction value of the correction table illustrated in FIG. 20 is added to the correction table using attribute information as a key. Then, the population calculation table (FIG. 22(b)) is generated based on the aggregation table (S210). This table is one in which the population is calculated by multiplying the correction value by the number of users.

Then, the population distribution is aggregated according to a criteria designated by an operator's operation (S211), and transmitted as population distribution data (S212).

In the above-described way, it is possible to generate population distribution data close to the actual population based on an actual attribute using a mobile communication terminal.

In the present embodiment, the transition matrix A is calculated based on the transition state from the number of actual users based on questionnaire data to the number of contractors based on contractor data, the inverse matrix $A^{-1}$ is calculated, and the number of users is derived from the number of contractors using the inverse matrix $A^{-1}$.

Meanwhile, a method reverse to the above method is considerable. In other words, a transition matrix B is calculated based on a transition state from the number of contractors to the number of actual users, and the number of users is derived from the number of contractors using the transition matrix B.

However, in the method using the transition matrix B, when the population distribution has a deviation, it may be difficult to accurately derive the number of users as will be described below. Next, the description will proceed in connection with a comparison between the number of users calculated using the inverse matrix $A^{-1}$ and the number of users calculated using the transition matrix B each time the population distribution has a deviation.

Figure 24:
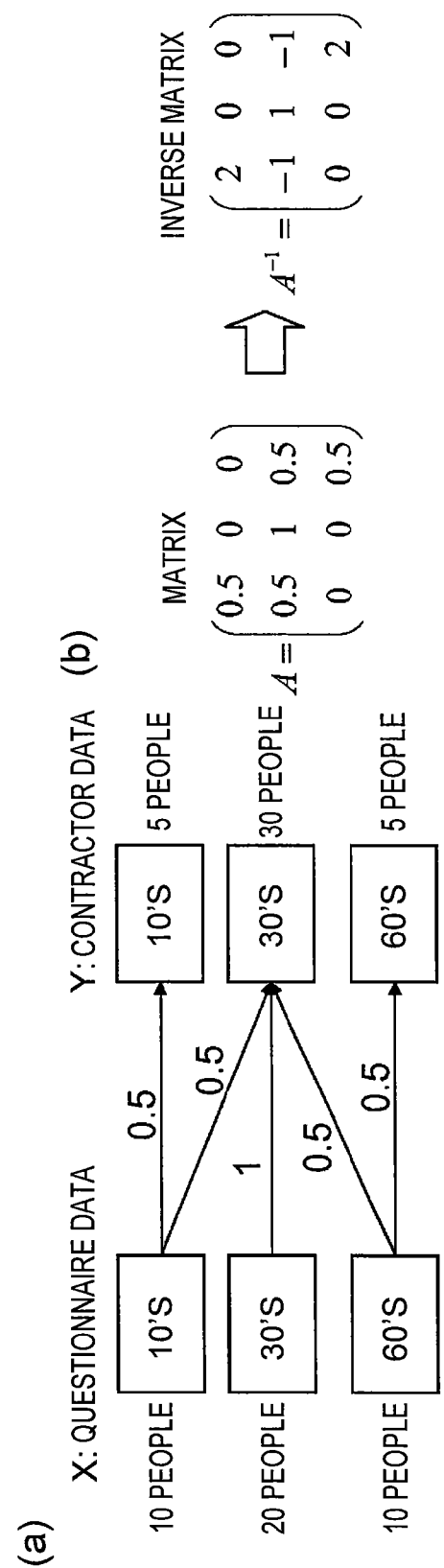
FIG. 24 is an explanatory diagram illustrating a calculation of a transition matrix A and an inverse matrix $A^{-1}$ of from the number of users to the number of contractors.

FIG. 24 is an explanatory diagram illustrating a calculation of the transition matrix A representing the transition state from the number of users based on questionnaire data to the number of contractors based on contractor data and the inverse matrix $A^{-1}$. Here, the description will proceed in connection with an example that is intended for an age period, that is, contractors or users of 10's, 30's, and 60's, for the sake of convenience of description.

As illustrated in FIG. 24(a), it can be understand from questionnaire data that among contractors of teenage users, 50% (0.5) is teenage and 50% (0.5) is people in their thirties. Similarly, 100% (1.0) of contractors of users in their thirties are people in their thirties, 50% (0.5) of contractors of users in their sixties are people in their thirties, and 50% (0.5) of contractors of users in their sixties are people in their sixties. The actual user may be different from the contractor when a protected person (a child or the like) is a contractor or when a guardian (parent) is a contractor.

The transition matrix A and the inverse matrix $A^{-1}$ expressed in the following Formulas (2) and (3) are generated based on the state illustrated in FIG. 24(a) (FIG. 24(b)).

[Math 1]

$$A = \begin{pmatrix} 0.5 & 0 & 0 \\ 0.5 & 1 & 0.5 \\ 0.5 & 0 & 0.5 \end{pmatrix} \quad (2)$$

[Math 2]

$$A^{-1} = \begin{pmatrix} 2 & 0 & 0 \\ -1 & 1 & -1 \\ 0 & 0 & 2 \end{pmatrix} \quad (3)$$

Figure 25:
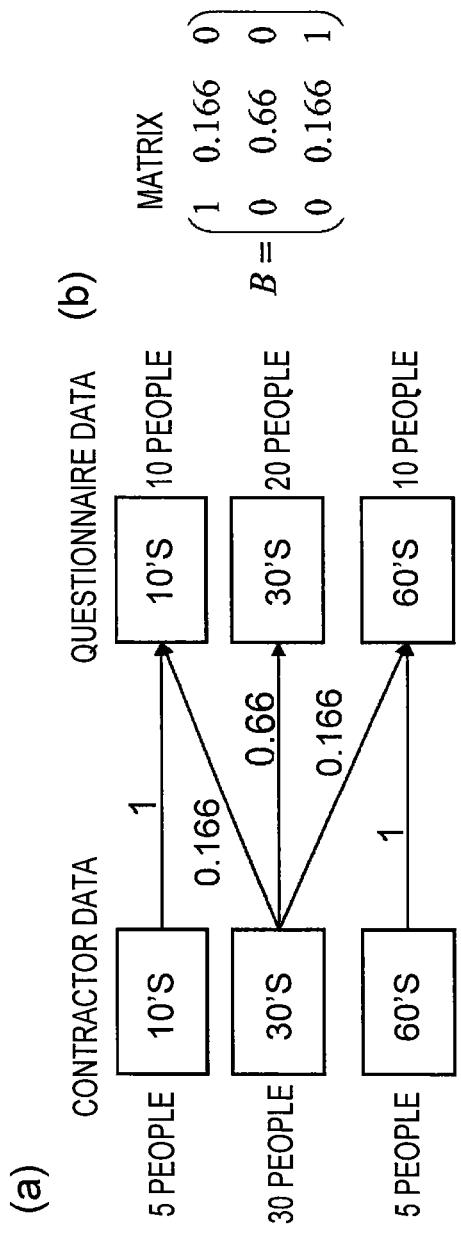
FIG. 25 is an explanatory diagram illustrating a calculation of a matrix B representing a transition state from the number of contractors based on contractor data to the number of users based on questionnaire data.

FIG. 25 is an explanatory diagram illustrating a calculation of the transition matrix B representing the transition state from the number of contractors based on contractor data to the number of users based on questionnaire data. Similarly to FIG. 24, contractor data is different from user data.

The transition matrix B expressed in the following Formula (4) is generated based on the transition state illustrated in FIG. 25(a) (FIG. 24(b)).

[Math 3]

$$B = \begin{pmatrix} 1 & 0.166 & 0 \\ 0 & 0.66 & 0 \\ 0 & 0.166 & 1 \end{pmatrix} \quad (4)$$

A comparison result when the number of users is calculated based on the number of contractors using the inverse matrix $A^{-1}$ and the transition matrix B will be described with reference to FIGS. 26 and 27.

FIG. 26 is an explanatory diagram illustrating a comparison result when the number of users is calculated based on the number of contractors using the inverse matrix $A^{-1}$ and the transition matrix B. FIG. 26(a) illustrates a comparison result when the nationwide population is the same in a distribution ratio of an attribute as a desired area. Here, when a nationwide population attribute distribution ratio (a real attribute) is 10's: 30's:60's=1:2:1, contractor data of a desired area is assumed to be configured with 15 teenage people, 90 people in their thirties, and 15 people in their sixties. At this time, as illustrated in FIG. 26(a), a result of the number of users is corrected to 30 teenage people, 60 people in their thirties, and 30 people in their sixties, and there is no difference although any of the inverse matrix $A^{-1}$ and the transition matrix B is used.

FIG. 26(b) illustrates a comparison result when the nationwide population is different in an attribute distribution ratio from a desired area. For example, contractor data of a desired area is assumed to be configured with 45 teenage people, 70 people in their thirties, and 5 people in their sixties. For example, an area in which there are many teenage people such as a school is assumed. Here, when the inverse matrix $A^{-1}$ is used, teenage people, people in their thirties, and people in their sixties are corrected to 90, 20, and 10 as illustrated in FIG. 26(b). However, when the transition matrix B is used, teenage people, people in their thirties, and people in their sixties are corrected to 56.6, 46.66, and 16.66. It can be understood that when the inverse matrix $A^{-1}$ is used, the number of teenage users is emphasized, and an accurate value is derived.

FIG. 26(c) illustrates a comparison result when the nationwide population is different in an attribute distribution ratio from a desired area. For example, contractor data of a desired area is assumed to be configured with 5 teenage people, 80 people in their thirties, and 35 people in their sixties. For example, an area in which there are many people in their sixties such as a nursing home or a public leisure school is assumed. Here, when the inverse matrix $A^{-1}$ is used, teenage people, people in their thirties, and people in their sixties are corrected to 10, 40, and 70 as illustrated in FIG. 26(c). However, when the transition matrix B is used, teenage people, people in their thirties, and people in their sixties are corrected to 18.333, 53.333, and 48.333. It can be understood that when the inverse matrix $A^{-1}$ is used, the number of users in their sixties is emphasized, and an accurate value is derived.

Next, influence of a collection rate of a questionnaire will be described. Generally, it is difficult to collect a questionnaire 100%, and a collection rate is assumed to differ according to an age period. Regarding influence in this case, it can be understood that when the inverse matrix $A^{-1}$ is used, a correction to a proper value is made with limited influence as described below.

For example, let us assume that a result of combining questionnaire data with contractor data (for example, FIG. 25(a)) is 10's:30's:60's=1:2:1, and questionnaire collection rates of 10's, 30's, and 60's are 20%, 50%, and 20%. In this case, the nationwide population attribute distribution ratio is 10's:30's:60's=1:5:1.

Further, in the case in which contractor data of a desired area is configured with 10 teenage people, 120 people in their thirties, and 10 people in their sixties, when the inverse matrix $A^{-1}$ is used, teenage people, people in their thirties, and people in their sixties are corrected to 20, 100, and 20 as illustrated in FIG. 27. However, when the transition matrix B is used, teenage people, people in their thirties, and people in their sixties are corrected to 30, 80, and 30. It can be understood that when the inverse matrix $A^{-1}$ is used, the number of users in their sixties is emphasized, and an accurate value is derived.

As described above, when the inverse matrix $A^{-1}$ is used, a correction to a more accurate value can be made than when the transition matrix B is used.

Next, operational effects of the position information aggregation system 1a according to the present embodiment will be described. The position information aggregation system 1a according to the present embodiment further includes the matrix generating unit 129 that generates the transition matrix A which is a transition matrix representing the ratio of attributes of actual users of all mobile communication terminals to attributes of contractors of all mobile communication terminals represented by contractor data, and generates the inverse matrices $A_1^{-1}$ and $A_2^{-1}$ from the transition matrix, in addition to the position information aggregation system 1. Further, the acquisition rate calculating unit 123a can correct the number of contractors of each attribute to the number of users using the inverse matrices $A_1^{-1}$ and $A_2^{-1}$ generated by the matrix generating unit 129, and the aggregating unit 127 can acquire the population distribution based on the position information in a certain area using the corrected number of users. Thus, it is possible to calculate the number of users which is closer to reality, and it is possible to the accurate population distribution.

Further, in the second embodiment, the number of users is calculated based on the number of contractors using the inverse matrices $A_1^{-1}$ and $A_2^{-1}$, and then the acquisition rate mask is calculated. However, the present invention is not limited to this example. For example, the acquisition rate mask may be calculated, the population (the population derived based on the number of contractors) may be calculated based on the acquisition rate mask, and the number of users may be calculated using the inverse matrices $A_1^{-1}$ and $A_2^{-1}$. For example, the population is calculated by aggregating the correction value of each attribute and each address code based on the table illustrated in FIG. 6 according to the first embodiment. The real population is considered to be calculated using the inverse matrices $A_1^{-1}$ and $A_1^{-1}$.

<Third Embodiment>

Next, a position information aggregation system 1b according to a third embodiment will be described. In the third embodiment, the number of users of each attribute is calculated using the feature quantity. Here, the "feature quantity" is information corresponding to estimation generation density of the position information of the mobile communication terminal 2 calculated by the position information calculating device 4. Here, the "estimation generation density" refers to an estimation value of the number of pieces of position information generated per a unit time around a time at which position information is generated when position information generated in connection with a certain mobile communication terminal 2 is considered.

Figure 28:
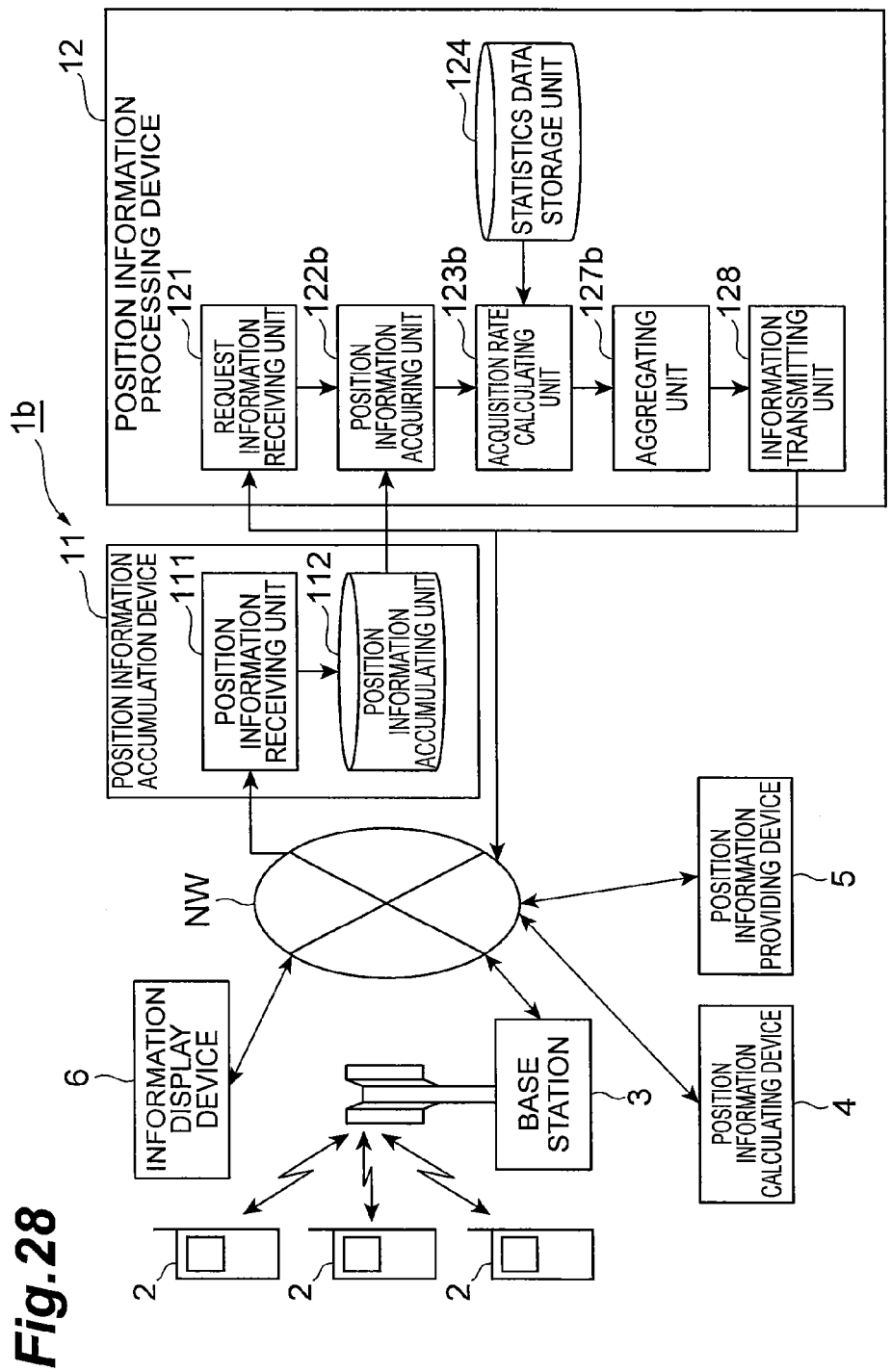
FIG. 28 is a schematic configuration diagram of a position information aggregation system according to a third embodiment.

FIG. 28 is a schematic configuration diagram of the position information aggregation system 1b according to the present embodiment. The position information aggregation system 1b according to the present embodiment is different from the first embodiment in that the position information acquiring unit 122 is replaced with a position information acquiring unit 122b, the acquisition rate calculating unit 123 is replaced with an acquisition rate calculating unit 123b, and the aggregating unit 127 is replaced with an aggregating unit 127b. Hereinafter, the present embodiment will be described in connection with the different point.

Figure 29:
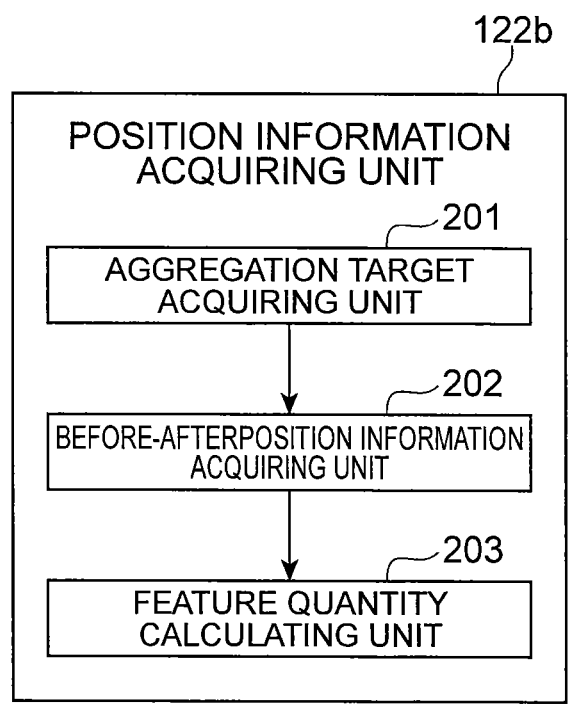
FIG. 29 is a schematic configuration diagram of a position information acquiring unit.

In response to an activation signal from the request information receiving unit 121, the position information acquiring unit 122b reads position information from the position information accumulating unit 112 of the position information accumulation device 11 and calculates a feature quantity based on the read position information. Here, the details of the position information acquiring unit 122b will be described. FIG. 29 is a schematic configuration diagram of the position information acquiring unit 122b. As illustrated in FIG. 29, the position information acquiring unit 122b includes an aggregation target acquiring unit 201, an before-after position information acquiring unit (an before-after position information acquiring section) 202, and a feature quantity calculating unit 203 (a feature quantity calculating section) 203.

The aggregation target acquiring unit 201 extracts position information matching with time zone information and area information included in request information from the information display device 6 from the position information accumulating unit 112 as aggregation target position information serving as a target to obtain the feature quantity. For example, an area represented by area information is a broad area such as the whole of Japan.

With respect to aggregation target position information (hereinafter, referred to as "first position information") of a target to obtain the feature quantity, the before-after position information acquiring unit 202 acquires a time at which immediately previous position information (hereinafter, referred to as "second position information") of the first position information among pieces of position information including the same user ID as the first position information is acquired, and a time at which immediately following position information (hereinafter, referred to as "third position information") of the first position information is acquired.

The feature quantity calculating unit 203 calculates the feature quantity on each first position information. For example, the feature quantity calculating unit 203 calculates the difference between an acquisition time of the second position information and an acquisition time of the third position information as the feature quantity on the first position information. Here, when the acquisition time of the second position information is an abnormal value, for example, when the difference between the acquisition time of the first position information and the acquisition time of the second position information is larger than a predetermined reference value (for example, one hour), the feature quantity calculating unit 203 calculates the feature quantity on the first position information using a time that goes back from the acquisition time of the first position information to the past by a predetermined time (for example, one hour) as the acquisition time of the second position information. Similarly, when the acquisition time of the third position information is an abnormal value, for example, when the difference between the acquisition time of the first position information and the acquisition time of the third position information is larger than a predetermined reference value (for example, one hour), the feature quantity calculating unit 203 calculates the feature quantity on the first position information using a time that goes forward from the acquisition time of the first position information to the future by a predetermined time (for example, one hour) as the acquisition time of the third position information. The process performed when the acquisition time of the second or third position information is an abnormal value is an optional process. However, by performing the process, when a position information acquisition time interval is abnormally increased because the mobile communication terminal 2 is positioned outside a service area or because power of the mobile communication terminal 2 is turned off, it is possible to prevent influence by the abnormally increased acquisition time interval from being excessive.

Further, the feature quantity calculating unit 203 associates the feature quantity calculated for each position information with the position information extracted by the aggregation target acquiring unit 201. FIG. 30 is a diagram illustrating the position information associated with the feature quantity. For example, as illustrated in FIG. 30, the feature quantity "wA" is associated with position information of a user ID "A" and time information "3/1 1:03."

The acquisition rate calculating unit 123b aggregates the number of users of a predetermined attribute in which position information is within a broad area based on the position information including the feature quantity acquired from the position information acquiring unit 122b using the feature quantity. Specifically, the acquisition rate calculating unit 123b calculates the number of users of a predetermined attribute based on the following Formula (5).

[Math 4]

$$\text{Number of user} = \frac{\sum_{i \in Attribute_k} \sum_{j=1}^{Y_i} w_{ij}}{2T}, \tag{5}$$

where T represents a time length of time zone information included in request information, and $Y_i$ represents the total number of pieces of position information within a broad area in a user i. Further, the attribute refers to attribute information such as a gender, an age, or an address code, which is included in position information. For example, when the number of users of "age of 20, male, Tokyo" is obtained, "age of 20, male, Tokyo" is used as an $attribute_k$ in Formula (5). Then, the number of users is calculated based on the feature quantity associated with position information corresponding to the attribute.

As described above, the acquisition rate calculating unit 123b can calculate the number of users of each of various attributes (for example, a gender, an age, an occupation, and an address code) by changing a condition of the $attribute_k$ in Formula (5). Further, the number of users within a narrow area can be obtained by applying the feature quantity of position information of a predetermined address code (a narrow area) serving as an attribute to Formula (5).

Further, similarly to the first embodiment, the acquisition rate calculating unit 123b calculates a position information acquisition rate of each attribute of the user of the mobile communication terminal 2 based on population statistics data corresponding to an attribute used to calculate the number of users using Formula (5) and the number of users calculated using Formula (5) among pieces of data stored in the statistics data storage unit 124. For example, when the number of users in which an attribute is "age of 20, male, Tokyo" is calculated using Formula (5), data in which an address code (narrow area) is Tokyo, an age is 20 years old, and a gender is male among pieces of data stored in the statistics data storage unit 124 is used as population statistics data. The acquisition rate calculating unit 123b generates a reciprocal number of the calculation position acquisition rate as acquisition rate mask data, and outputs the reciprocal number to the aggregating unit 127.

Further, in the first embodiment, when the position information acquisition rate is repeatedly generated, position information acquisition rates of second and subsequent types are corrected using a value obtained by dividing "the total number of pieces of position information within a broad area" by the total number of pieces of population statistics data in a broad area. In the third embodiment, "the total number of pieces of position information within a broad area" can be obtained using the feature quantity. Specifically, position information acquisition rates of second and subsequent types are corrected using a value obtained by dividing the number of users obtained using the attribute $_K$ in Formula (5) as all attributes by the total number of pieces of population statistics data in a broad area.

Similarly to the first embodiment, the aggregating unit 127b calculates a correction value by repeatedly reflecting the acquisition rate mask corresponding to attribute information of two or more types included in corresponding position information on all pieces of position information extracted by the position information acquiring unit 122, and the correction value to the position information (FIG. 6). Further, in the third embodiment, the aggregating unit 127b aggregates the actual population distribution of a plurality of predetermined aggregation areas using the correction value added to the position information and the feature quantity associated with each position information. Specifically, the aggregating unit 127b calculates an actual population of a predetermined aggregation area based on the following Formula (6), and obtains the actual population distribution of a plurality of predetermined aggregation areas.

[Math 5]

$$\text{Population} = \sum_k \left( \frac{\sum_{i \in \text{Attribute}_k} \sum_{j=1}^{X_i} W_{ij}}{2T} \times \text{Correction value}_k \right) \quad (6)$$

Here, the correction value$_k$ is a correction value associated with position information corresponding to the attribute$_k$. By including a predetermined aggregation area whose population is desired to be calculated as the attribute$_k$, the population of the predetermined aggregation area can be calculated.

In Formula (6), through a calculation in parentheses, the population of each attribute existing in a predetermined aggregation area is calculated using the feature quantity and the correction value. Further, in Formula (6), the population of all attributes existing in a predetermined aggregation areas obtained by summing up the populations of the respective attributes. Further, as illustrated in FIG. 6, the correction value is added to each position information, but the feature quantity in which the correction value is reflected may be added to the position information. In this case, since the correction is reflected in the feature quantity in advance, multiplication of the "correction value$_k$" in Formula (6) is unnecessary.

The actual population distribution of a plurality of predetermined aggregation areas calculated using Formula (6) is transmitted to the information display unit 6 through the information transmitting unit 128.

[Concept and Calculation Method of Mobile Communication terminal Number Estimation]

Figure 31:
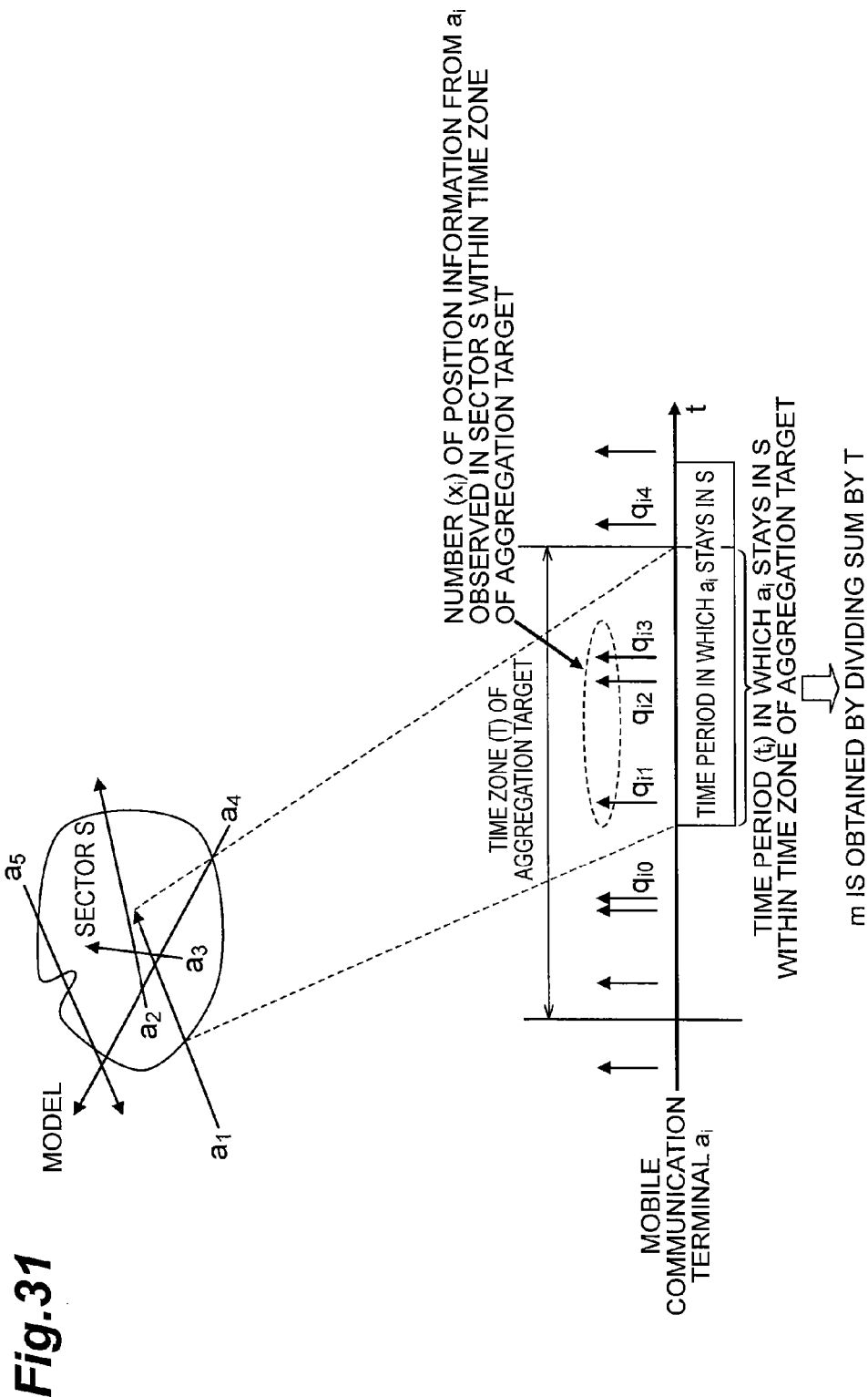
FIG. 31 is a diagram for describing a concept of mobile communication terminal number estimation.

Here, a concept and a calculation method of mobile communication terminal number estimation will be described. As in a model illustrated in FIG. 31, it is assumed that n mobile communication terminals $a_1, a_2, \ldots, a_n$ pass through a sector S during a time zone (a length T) of a certain aggregation target, and a stay time of the mobile communication terminal $a_i$ in the sector S within the time zone of the aggregation target is $t_i$ ($0 < t_i \le T$). At this time, the number m of mobile communication terminals located in the sector S (actually, an average value of the number m of mobile communication terminals located in the sector S within the time zone of the aggregation target) is expressed by the following Formula (7).

[Math 6]

$$m = \sum_{i=1}^{n} t_i / T \quad (7)$$

In other words, a value obtained by dividing the sum of the stay times $t_i$ of the mobile communication terminals ai in the sector S within the time zone of the aggregation target by the length T of the time zone of the aggregation target is estimated as the number m of mobile communication terminals. However, it is difficult to measure the real value of the stay time $t_i$ of the mobile communication terminal $a_i$ in the sector S within the time zone of the aggregation target, but it is possible to calculate position information of each mobile communication terminal $a_i$.

Here, when the mobile communication terminal $a_i$ makes a positioning request in the sector S within the time zone of the aggregation target and sorts position information calculated based on the positioning request in time order $$q_{i1}, q_{i2}, \ldots, q_{ix}, \quad \text{[Math 7]}$$

($x_i$ is the total number of pieces of position information based on the positioning request that the mobile communication terminal $a_i$ has made in the sector S within the time zone of the aggregation target), estimation of the number of mobile communication terminals is nothing but estimation of the value m based on calculated position information $q_{ij}$ a is an integer of 1 or more or $x_i$ or less).

Next, the calculation method of mobile communication terminal number estimation will be described with reference to FIG. 32. Here, the density in which the positioning request is made by the mobile communication terminal $a_i$ and the position information $q_{ij}$ is calculated (that is, the number of pieces of position information per unit time) is referred to as $p_i$. At this time, when the probability at which position information is calculated is independent of a sector, an expectation value E ($x_i$) of the total number $x_i$ of pieces of position information based on the positioning request that the mobile communication terminal $a_i$ has made in the sector S within the time zone of the aggregation target is $t_i \times p_i$. Thus, an expectation value $E(t_i)$ of the stay time $t_i$ of the mobile communication terminal $a_i$ in the sector S within the time zone of the aggregation target satisfies the following Formula (8).

$$E(t_i)=x_i/p_i \qquad (8)$$

Here, when an acquisition time at which the position information receiving unit 111 acquires the position information $q_{ij}$ is $u_{ij}$, the density $p_{ij}$ of the position information $q_{ij}$ is obtained by the following Formula (9).

$$p_{ij}=2/(u_{i(j+1)}-u_{i(j-1)}) \qquad (9)$$

Here, when the position information $q_{ij}$ is assumed as the first position information, the position information $q_{i(j-1)}$ corresponds to the second position information, and the position information $q_{i(j+i)}$ corresponds to the third position information. In the present embodiment, the difference between an acquisition time $u_{i(j-1)}$ of the second the position information $q_{i(j-1)}$ and an acquisition time $u_{i(j+1)}$ of the third the position information $q_{i(j+1)}$, that is, $(u_{i(j+1)}-u_{i(j-1)})$ in Formula (9) is the feature quantity on the first position information $w_{ij}$. Therefore, Formula (9) can be expressed below. In other words, the feature quantity $w_{ij}$ can be calculated based on the reciprocal number of the density $p_{ij}$.

$$p_{ij}=2/(u_{i(j+1)})-u_{i(j-1)})=2/w_{ij} \qquad (10)$$

At this time, the density $p_i$ is obtained by Formula (11).

[Math 8]

$$p_i = x_i / E(t_i) = \left(x_i \bigg/ \sum_{j=1}^{x_i} w_{ij}\right) \times 2 \qquad (11)$$

Thus, an estimation value E(m) of the number m of mobile communication terminals can be calculated by the following Formula (12).

[Math 9]

$$E(m) = \left(\sum_{i=1}^{n}\sum_{j=1}^{x_i}(w_{ij}/2)\right)\bigg/T = \left(\sum_{i=1}^{n}\sum_{j=1}^{x_i}w_{ij}\right)\bigg/2T \qquad (12)$$

Figure 32:
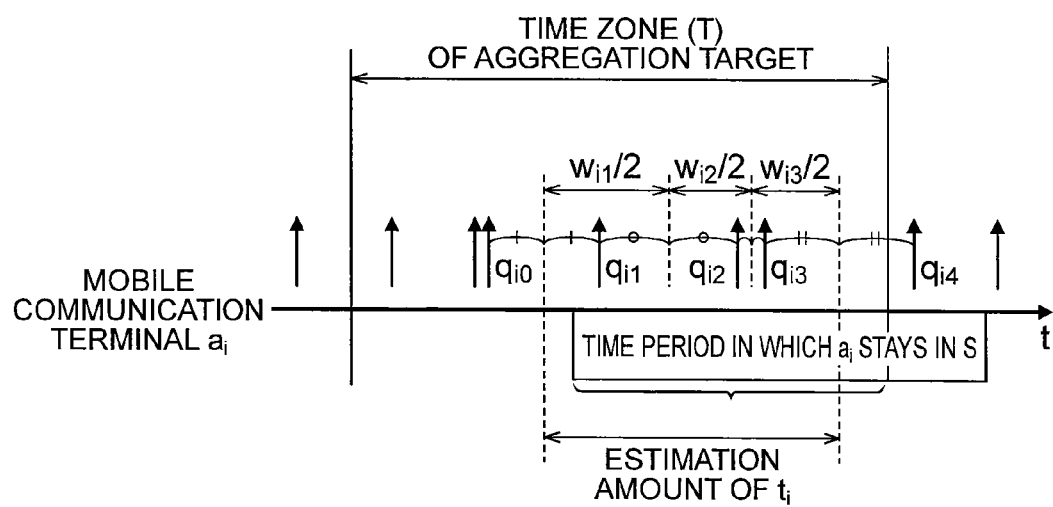
FIG. 32 is a diagram for describing a calculating method related to mobile communication terminal number estimation.

As illustrated in the example of FIG. 32, when the position information $q_{i1}$, $q_{i2}$, and $q_{i3}$ is acquired based on the positioning request from the mobile communication terminal $a_i$ during a time period in which the mobile communication terminal $a_i$ stays in the sector S within the time zone of the aggregation target, the position information $q_{i0}$ is acquired immediately before the position information $q_{i1}$, the position information $q_{i4}$ is acquired immediately after the position information $q_{i3}$, and the acquisition times of the position information $q_{i0}$, $q_{i1}$, $q_{i2}$, $q_{i3}$, $q_{i4}$ are $u_{i0}$, $u_{i1}$, $u_{i2}$, $u_{i3}$, and $u_{i4}$, the concept corresponds to what a time period from a middle point between $u_{i0}$ and $u_{i1}$ to a middle point between $u_{i3}$ and $u_{i4}$ is estimated as the stay time $t_i$ of the mobile communication terminal $a_i$ in the sector S within the time zone of the aggregation target. In addition, the mobile communication terminal $a_i$ makes the positioning request while staying in the sector S although it is not within the time zone of the aggregation target, and the position information $q_{i4}$ is calculated based on the positioning request. Here, a process not to estimate an end time of the stay time $t_i$ to be the same as an end time of the time zone T of the aggregation target in order to keep unbiasedness of an estimation amount of the stay time $t_i$ will be described as an example.

Figure 33:
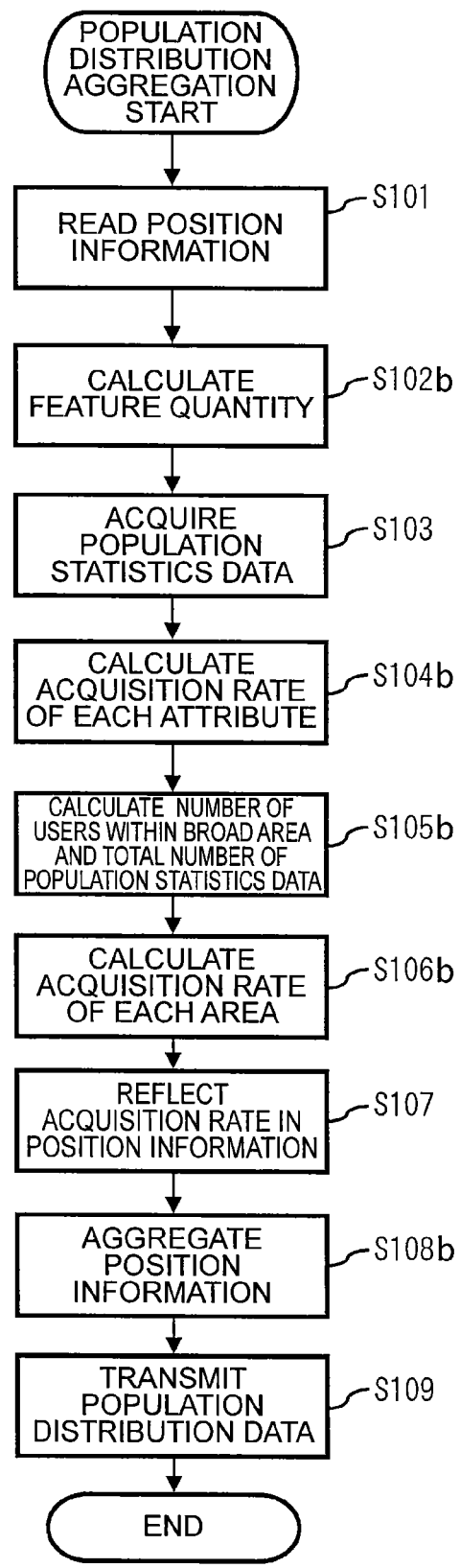
FIG. 33 is a flowchart illustrating an operation at the time of a population distribution aggregation process.

Next, the details of the population distribution aggregation process performed the position information processing device 12 will be described with reference to a flowchart illustrating an operation at the time of the population distribution aggregation process illustrated in FIG. 33 will be described. This process is different from the population distribution aggregation process of the first embodiment described with reference to FIG. 9 in the process of steps 102b, 104b, 105b, 106b, and 108b. Next, process content will be described in connection with the different points, and a description of the same process as in the first embodiment will not be made.

The acquisition rate calculating unit 123b of the position information processing device 12 reads position information from the position information accumulating unit 112 of the position information accumulation device 11, and calculates the feature quantity based on the read position information (step S102b).

The acquisition rate calculating unit 123b of the position information processing device 12 calculates the number of users (user population pyramid data) of a predetermined attribute in which position information corresponds to a broad area based on position information including the feature quantity acquired from the position information acquiring unit 122b. Then, the acquisition rate calculating unit 123b calculates a reciprocal number of a position information acquisition rate on the actual population of each attribute of the user of the mobile communication terminal 2 based on the calculated user population pyramid data and population statistics data corresponding to an attribute used to calculate a user population pyramid among pieces of data stored in the statistics data storage unit 124 (step S104b).

Thereafter, the acquisition rate calculating unit 123b of the position information processing device 12 calculates the number of users within the broad area using the attribute$_K$ in Formula (5) as all attributes, and acquires the total number of pieces of population statistics data in the broad area (step S105b).

Thereafter, the acquisition rate calculating unit 123b corrects position information acquisition rates of second and subsequent types using a value obtained by dividing the number of users in the broad area by the total number of pieces of population statistics data (step 106b), and the aggregating unit 127b adds the correction value in which the reciprocal number of the position information acquisition rate corresponding to the attribute is reflected to all pieces of position information (step S107). Then, the aggregating unit 127b applies the correction value added to the position information and the feature quantity associated with each position information to Formula (6), aggregates the actual population distribution of a plurality of predetermined aggregation areas, and generates the aggregation result information serving as population distribution data (step S108b).

As described above, the position information aggregation system 1b according to the present embodiment can calculate the number of users of each attribute based on the feature quantity on the position information. As described above, the actual population distribution of each predetermined aggregation areas can be obtained with a high degree of accuracy using the feature quantity.

<Modified Example of Third Embodiment>

Next, a modified example of the third embodiment will be described. In the third embodiment, the time difference (the time difference between the second position information and the third position information) between position information before position information (the position information) in which the feature quantity is desired to be calculated and position information after the position information is calculated as the feature quantity. Here, the feature quantity may be expressed by the following Formula (13). The following Formula (13) is derived from modification of Formula (10) and equivalent to Formula (10) (that is, the concept of Formula (10) is not changed).

$$w_{ij}=u_{i(j+1)}-u_{i(j-1)} \tag{13}$$

In the present modified example, a calculation method of the feature quantity calculated by the feature quantity calculating unit 203 is changed.

In the present modified example, position information stored in the position information accumulating unit 112 includes information (signal type information) related to the type of position information that represents either position information generated based on the positioning process (periodic location registration) performed at regular intervals in the positioning process using base station information or position information generated based on the positioning process performed outside a communication area of a base station (see FIG. 34). Specifically, in FIG. 34, when the signal type information represents the position information generated based on the positioning process performed at regular intervals, "A" is associated as the signal type information. Further, when the signal type information represents position information generated based on the positioning process performed outside a communication area of a base station, "B" is associated as the signal type information. Further, besides the information related to the method of the positioning process, for example, information representing position information generated when power of the mobile communication terminal 2 is turned on or off may be used as the information related to the type of position information included in the position information.

The feature quantity calculating unit 203 of the position information processing device 12b obtains the feature quantity of the first position information in view of the signal type information on the second position information and the third position information. Specifically, first, the feature quantity calculating unit 203 calculates a value obtained by multiplying the time difference between the third position information and the first position information by a correction coefficient α corresponding to the signal type of the third position information. Then, the feature quantity calculating unit 203 calculates a value obtained by multiplying the difference between the first position information and the second position information by a correction coefficient β corresponding to the signal type of the second position information. Then, the feature quantity calculating unit 203 uses a value obtained by adding the calculated values as the feature quantity. However, besides the case in which the feature quantity is calculated in view of the signal type information on the second position information and the third position information, the signal type information of the first position information, the signal type information of the first position information and the second position information, or the signal type information of the first position information and the third position information may be considered. Further, the signal type information of all of the first to third position information may be considered.

Here, a value which is decided for each of the signal type information "A" and "B" of the third position information in advance is used as the correction coefficient α corresponding to the signal type of the third position information. Here, the correction coefficient α has a value ranging from 0 to 2. Similarly, a value which is decided for each of the signal type information "A" and "B" of the second position information in advance is used as the correction coefficient β corresponding to the signal type of the second position information. Here, the correction coefficient β has a value ranging from 0 to 2. The values of the correction coefficients α and β described above are exemplary, and the present invention is not limited to the values.

The calculation process of the feature quantity in the feature quantity calculating unit 203 can be expressed by the following Formula (14):

$$w_{ij}=\alpha(u_{i(j+1)}-u_{ij})+\beta(u_{ij}-u_{i(j-1)}) \tag{14}$$

As described above, when the feature quantity on the first position information is calculated, the feature quantity calculating unit 203 corrects the time difference using the signal type information on the second and third position information which are the position information before and after the first position information, and calculates the feature quantity using the corrected time difference. As a result, the feature quantity can be calculated based on the signal type information of the position information with a high degree of accuracy.

Here, an example in which the feature quantity is calculated based on the signal type information of the first position information will be described as an example of a case in which the feature quantity is calculated using Formula (14). In case of position information in which the position of the mobile communication terminal 2 has no relation with a generation trigger of position information such as position information based on the positioning process performed at regular intervals, an expectation value of a stay time period in a current sector before the corresponding position information is generated is considered to be the same as that after the corresponding position information is generated. However, in case of position information generated based on the positioning process performed outside a communication area of a base station, the mobile communication terminal 2 can be determined as having not stayed in a current section at least before the corresponding position information is generated. Thus, when zero (0) is considered as a time period in which the mobile communication terminal 2 stays in the current sector before the corresponding position information is generated and type information (generation cause) of first position data represents a "communication area boundary," it is possible to set the correction coefficient β (that is, the correction coefficient β related to a time difference with immediately previous position data) in Formula (14) to zero (0). Thus, the feature quantity which is closer to reality can be calculated.

In the above embodiments and the modified examples, the user ID (the user specifying information) specifying the user of the mobile communication terminal 2 is added to position information. The user ID is at least preferably used to be distinguished from another user. Thus, information obtained by performing a confidentiality protection process including conversion to an irreversible code by a one-way function on information used to specifying a user may be used as the user ID. As the one-way function, a keyed hash function based on a hash function which is suggested by domestic and international evaluation projects and organizations may be employed. For example, the confidentiality protection process may be performed in the position information receiving unit 111. However, the confidentiality protection process may be performed by any part other than the position information receiving unit 111.

In addition, the aggregation method of the mobile communication terminal using the feature quantity described in the third embodiment and the modified example of the third embodiment may be used in the second embodiment.

REFERENCE SIGNS LIST 1, 1a, 1b: position information aggregation system
2: mobile communication terminal
11: position information accumulation device (position information aggregation device)
12: position information processing device (position information aggregation device)
111: position information receiving unit (position information receiving section)
122, 122b: position information acquiring unit (aggregating section)
123, 123a, 123b: acquisition rate calculating unit (acquisition rate calculating section)
127, 127b: aggregating unit (aggregating section)
129: matrix generating unit (generating section)

The invention claimed is:

1. A position information aggregation system, comprising: circuitry configured to
receive position information related to positions of a plurality of mobile communication terminals, time information indicating when the position information was obtained, user specifying information specifying a user of the mobile communication terminal corresponding to each position information and attribute information representing an attribute including address information of the user;
calculate a position information acquisition rate corresponding to each of a plurality of narrow areas based on population statistic data of each narrow area within a predetermined broad area and position information obtained within a predetermined time interval from among the position information; and
aggregate a population distribution in a designated area by extracting position information corresponding to the designated area based on the position information and aggregating position information in which the position information acquisition rate of the narrow area corresponding to the address information is reflected.

2. The position information aggregation system according to claim 1, wherein
the circuitry is further configured to calculate the position information acquisition rate by calculating a ratio between the population statistic data and a number of the mobile communication terminals based on the position information.

3. The position information aggregation system according to claim 1, wherein
the circuitry is further configured to calculate the position information acquisition rate using the population statistic data of each attribute and position information aggregated for each attribute information.

4. The position information aggregation system according to claim 1, further comprising:
a memory configured to store the user specifying information, the position information, the time information and the attribute information representing an attribute including address information of the user in association with one another, wherein
the circuitry is further configured to calculate the position information acquisition rate based on the information stored in the memory.

5. The position information aggregation system according to claim 1, wherein the circuitry is further configured to:
receive the position information and two or more types of attribute information associated with the position information;
repeatedly calculate position information acquisition rates of each of the two or more types of attributes of the plurality of mobile communication terminals based on the population statistic data and the position information; and
aggregate the position information while repeatedly reflecting the position information acquisition rates of each of the two or more types of attributes corresponding to the attribute information.

6. The position information aggregation system according to claim 1, wherein
the circuitry is further configured to aggregate the population distribution by correcting the position information using a value obtained by dividing a total number of pieces of position information within the broad area by a total number of pieces of population statistic data in the broad area.

7. The position information aggregation system according to claim 1, wherein the circuitry is further configured to:
generate a transition matrix representing a ratio of attributes of actual users of all mobile communication terminals to attributes of contractors of all mobile communication terminals represented by contractor information;
generate an inverse matrix based on the transition matrix; and
correct a population distribution of each attribute using the inverse matrix when position information in the designated area is aggregated.

8. The position information aggregation system according to claim 1, wherein the circuitry is further configured to:
acquire, with respect to first position information of the position information, time information of second position information which is at a time preceding position information of the first position information among pieces of position information including same user specifying information as the first position information and time information of third position information which is at a time following position information of the first position information;
calculate a feature quantity of the first position information based on two or more of the time information of the first position information, the time information of the second position information, and the time information of the third position information;
calculate a position information acquisition rate of each narrow area of the plurality of mobile communication terminals using the population statistic data and the feature quantity; and
aggregate a population distribution in the designated area by reflecting the position information acquisition rate of a narrow area corresponding to address information included in the position information in a feature quantity on the position information corresponding to the designated area.

9. The position information aggregation system according to claim 8, wherein the circuitry is further configured to:
generate a transition matrix representing a ratio of attributes of actual users of all mobile communication terminals to attributes of contractors of all mobile communication terminals represented by contractor information;
generate an inverse matrix based on the transition matrix; and correct a population distribution of each attribute using the inverse matrix when position information in the designated area is aggregated.

10. The position information aggregation system according to claim 1, wherein
the circuitry is further configured to perform a confidentiality protection process including conversion to an irreversible code by a one-way function on the user specifying information.

11. A position information aggregation method performed by a position information aggregation system, comprising:
receiving position information related to positions of a plurality of mobile communication terminals, time information indicating when the position information was obtained, user specifying information specifying a user of the mobile communication terminal corresponding to each position information and attribute information representing an attribute including address information of the user;
calculating a position information acquisition rate corresponding to each of a plurality of narrow areas based on population statistic data of each narrow area within a predetermined broad area and position information obtained within a predetermined time interval from among the position information; and
aggregating, by circuitry of the position information aggregation system, a population distribution in a designated area by extracting position information corresponding to the designated area based on the position information and aggregating position information in which the position information acquisition rate of the narrow area corresponding to the address information is reflected.

12. A non-transitory computer-readable medium including computer program instructions, which when executed by an information processing system, cause the information processing system to execute:
receive position information related to positions of a plurality of mobile communication terminals, time information indicating when the position information was obtained, user specifying information specifying a user of the mobile communication terminal corresponding to each position information and attribute information representing an attribute including address information of the user;
calculate a position information acquisition rate corresponding to each of a plurality of narrow areas based on population statistic data of each narrow area within a predetermined broad area and position information obtained within a predetermined time interval from among the position information; and
aggregate a population distribution in a designated area by extracting position information corresponding to the designated area based on the position information and aggregating position information in which the position information acquisition rate of the narrow area corresponding to the address information is reflected.

* * * * *